(12) United States Patent
Mellor et al.

(10) Patent No.: US 10,946,480 B2
(45) Date of Patent: Mar. 16, 2021

(54) FOIL FUSION ADDITIVE MANUFACTURING SYSTEM AND METHOD

(71) Applicant: The Boeing Company, Chicago, IL (US)

(72) Inventors: Mitchell Loren Ray Mellor, Bothell, WA (US); Troy Allan Haworth, Snohomish, WA (US); Matthew Ryoichi Soja, Seattle, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 16/049,677

(22) Filed: Jul. 30, 2018

(65) Prior Publication Data

US 2020/0001398 A1 Jan. 2, 2020

Related U.S. Application Data

(60) Provisional application No. 62/693,244, filed on Jul. 2, 2018.

(51) Int. Cl.
*B23K 26/34* (2014.01)
*B33Y 10/00* (2015.01)
*B23K 26/342* (2014.01)
*B33Y 30/00* (2015.01)
(Continued)

(52) U.S. Cl.
CPC .......... *B23K 26/342* (2015.10); *B23K 26/123* (2013.01); *B33Y 10/00* (2014.12);
(Continued)

(58) Field of Classification Search
CPC .. B23K 26/342; B23K 26/123; B23K 20/103; B23K 20/22; B23K 26/38; B23K 26/40;
(Continued)

(56) References Cited

U.S. PATENT DOCUMENTS 5,730,817 A * 3/1998 Feygin ................ B32B 37/1045
156/64
5,876,550 A 3/1999 Feygin
(Continued)

FOREIGN PATENT DOCUMENTS

DE 102008058613 5/2010
EP 2693612 2/2014
(Continued)

OTHER PUBLICATIONS

EPO, Extended European Search Report, Appl. No. 19181741.0, dated Dec. 9, 2019.

*Primary Examiner* — Brian W Jennison

(57) ABSTRACT

An additive manufacturing system includes a foil supply drum, a melting energy source, and a processor. The foil supply drum is configured to be rotated for dispensing a foil sheet over a substrate surface supported by a build element. The melting energy source is configured to direct at least one melting energy beam onto a non-melted region of the foil sheet located over the substrate surface. The processor is configured to execute computable readable program instructions based on a three-dimensional digital definition of the object, and control the melting energy beam to selectively melt at least some of the non-melted region into melted portions forming a material layer of the object onto the substrate surface while separating the melted portions from non-melted portions, and command rotation of the foil supply drum for dispensing the foil sheet during manufacturing of the object in correspondence with the digital definition.

24 Claims, 16 Drawing Sheets

(51) Int. Cl.
*B33Y 70/00* (2020.01)
*B23K 26/12* (2014.01)
*B33Y 50/02* (2015.01)
*B23K 26/70* (2014.01)

(52) U.S. Cl.
CPC ............... *B33Y 30/00* (2014.12); *B33Y 70/00* (2014.12); *B23K 26/702* (2015.10); *B33Y 50/02* (2014.12)

(58) Field of Classification Search
CPC ......... B33Y 10/00; B33Y 50/02; B33Y 70/00; B33Y 30/00
See application file for complete search history.

(56) References Cited

U.S. PATENT DOCUMENTS

| | | |
|---|---|---|
| 2014/0197576 A1 | 7/2014 | Kraibuhler et al. |
| 2016/0090842 A1* | 3/2016 | Luo .......................... F01D 5/147 416/232 |
| 2016/0101470 A1* | 4/2016 | Kamakura ............ B29C 64/153 419/5 |
| 2016/0151833 A1 | 6/2016 | Tsao |
| 2016/0193688 A1* | 7/2016 | Kironn ................. B23K 20/103 219/76.12 |
| 2018/0186074 A1 | 7/2018 | Hull |

FOREIGN PATENT DOCUMENTS

| | | |
|---|---|---|
| FR | 3038538 | 1/2017 |
| WO | WO2015020954 | 3/2003 |
| WO | WO2017065751 | 4/2017 |

* cited by examiner (TOP VIEW)

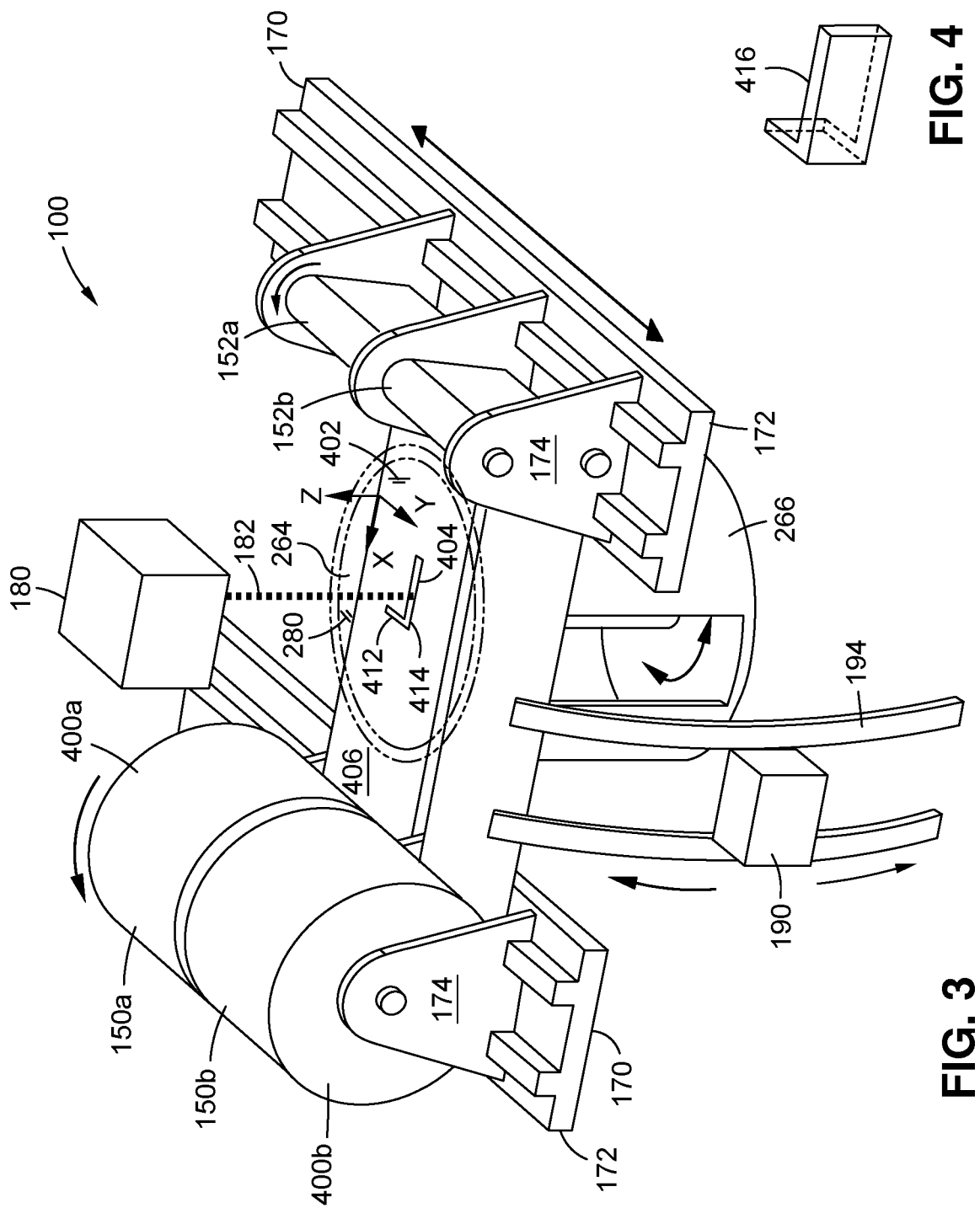

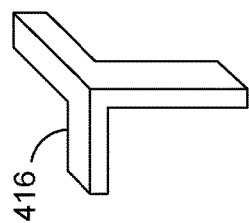
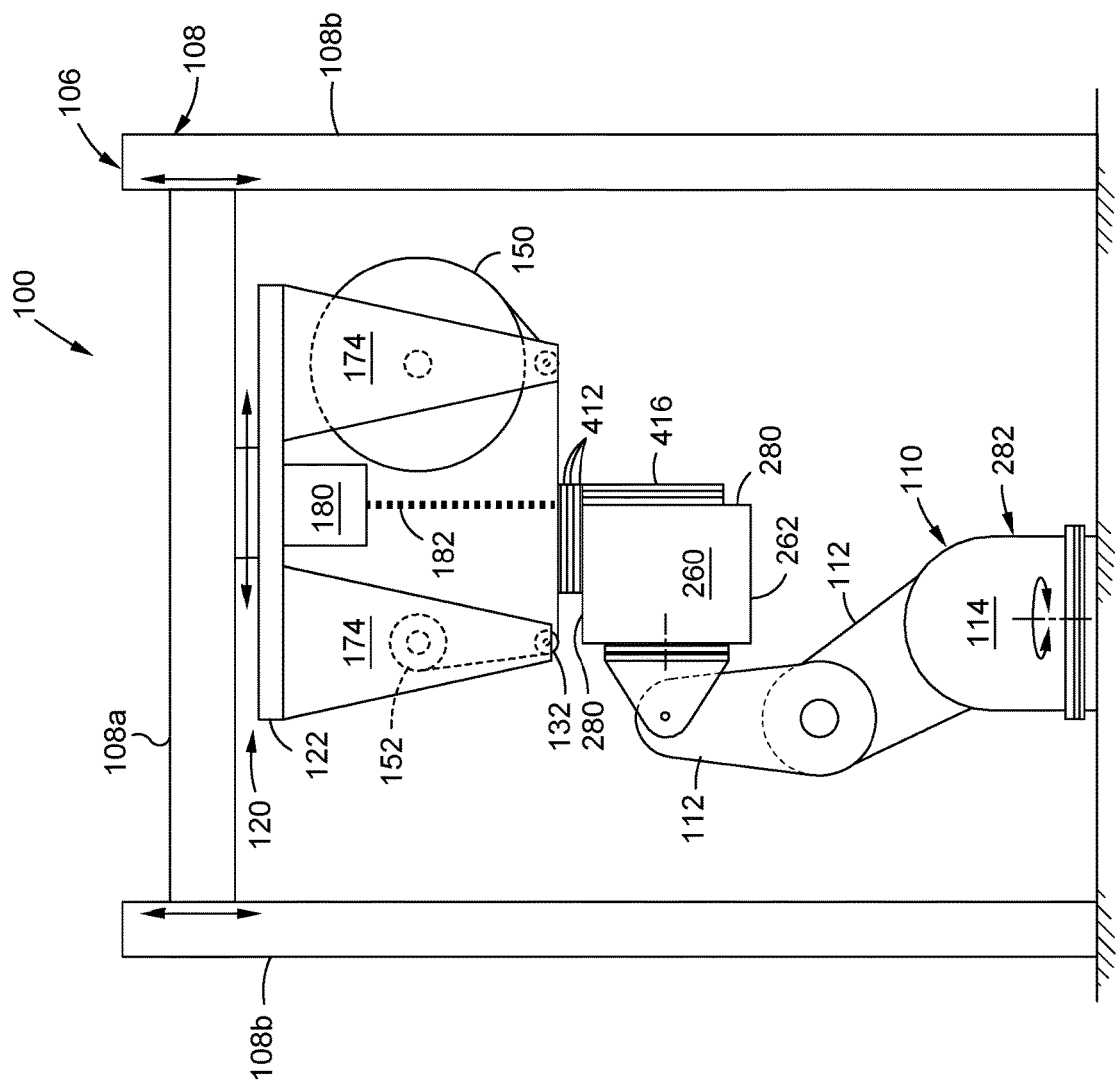

FOIL FUSION ADDITIVE MANUFACTURING SYSTEM AND METHOD

CROSS-REFERENCE TO RELATED APPLICATIONS

The application claims priority to U.S. Provisional Application Ser. No. 62/693,244, filed Jul. 2, 2018, which is incorporated herein by reference in its entirety.

FIELD

The present disclosure relates generally to manufacturing systems and, more particularly, to an additive manufacturing system for forming an object by melting a foil sheet to incrementally form a stack of material layers according to a digital definition of the object.

BACKGROUND

Additive manufacturing enables the production of objects in a wide variety of intricate shapes in a unitary body. Powder bed additive manufacturing involves the deposition or spreading of a thin layer of powder material over a substrate surface and then melting and fusing together the powder material. The process is repeated layer by layer until the object is complete.

Although an effective manufacturing technique, powder bed additive manufacturing is a relatively slow process that requires large amounts of powder material having complex handling requirements. In addition, at the completion of the manufacturing process, the object is covered with excess powder which must be removed. Furthermore, the relatively high cost of certain powder materials such as metal powder dictates that the excess powder is recycled. Recycling of metal powder is complex due to the sensitivity of metal powder to contamination during handling and during deposition, and may require special controls due to the reactive nature of certain types of metal powder. At the completion of the manufacturing process, the object may require stress relieving to reduce thermal stresses induced during fusing of the layers, and/or post-machining for surface smoothing or to bring the object to within design tolerances.

As can be seen, there exists a need in the art for a system and method for rapidly manufacturing an object in a cost-effective manner and which avoids the above-noted characteristics associated with powder bed additive manufacturing.

SUMMARY

The above-noted needs associated with additive manufacturing are specifically addressed by the present disclosure which provides an additive manufacturing system having at least one foil supply drum, at least one melting energy source, and a processor. The foil supply drum is configured to be rotated for dispensing a foil sheet over a substrate surface supported by a build element. The melting energy source is configured to direct at least one melting energy beam onto a non-melted region of the foil sheet located over the substrate surface. The processor is configured to execute computable readable program instructions based on a three-dimensional digital definition of the object, and control the melting energy beam to selectively melt at least some of the non-melted region into melted portions forming a material layer of the object onto the substrate surface while separating or cutting the melted portions from non-melted portions, and commanding rotation of the foil supply drum for dispensing the foil sheet during manufacturing of the object in correspondence with the digital definition.

Also disclosed is a method of additively manufacturing an object. The method includes step (a) of dispensing, from a foil supply drum, a foil sheet over a substrate surface supported by a build element. In addition, the method includes step (b) of directing, from at least one melting energy source, at least one melting energy beam onto a non-melted region of the foil sheet located over the substrate surface. The method also includes step (c) of melting, using the melting energy beam, the non-melted region into one or more melted portions to form a material layer over the substrate surface in accordance with a three-dimensional digital definition of the object while separating or cutting the melted portions from non-melted portions to form perimeter edges of the material layer in correspondence with the digital definition. Furthermore, the method includes step (d) of rotating the foil supply drum to dispense another non-melted region of the foil sheet over the most recently applied material. Steps (a) through (d) are repeated until completion of the object according to the digital definition.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of an example of a manufacturing system having a pair of foil supply drums and a corresponding pair of foil take-up drums;

FIG. 4 is a perspective view of an example of an object that may be manufactured by the manufacturing system;

FIG. 11 shows the manufacturing system of FIG. 10 after the build element has been rotated by the robotic device into a different orientation than in FIG. 11 to allow the foil application head to apply material layers onto another substrate surface of the build element;

FIG. 12 is an example of an object manufactured using the manufacturing system of FIGS. 10-11;

DETAILED DESCRIPTION

Figure 1:
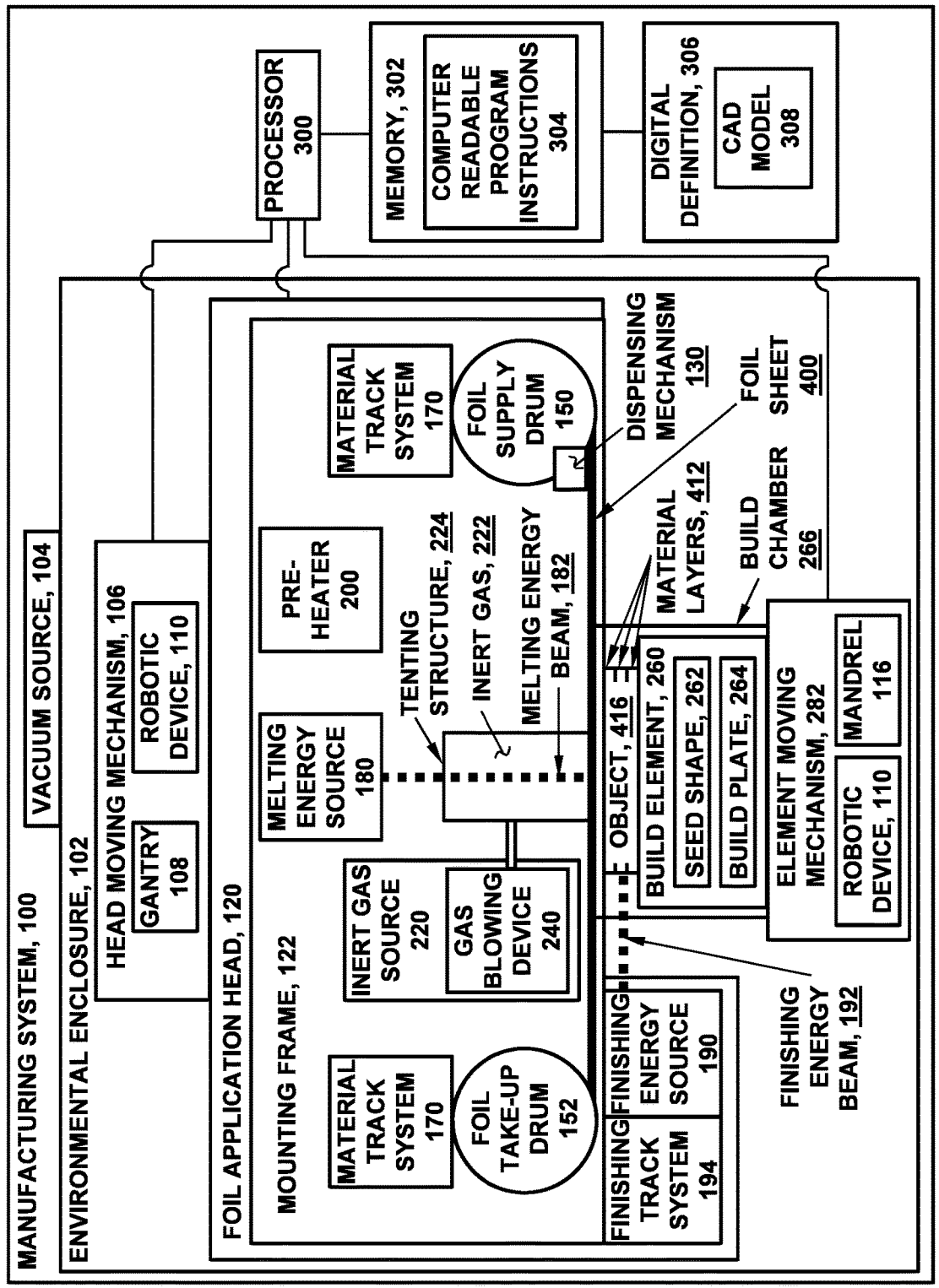
FIG. 1 is a block diagram of an example of a system for additive manufacturing of an object based on a three-dimensional digital definition of the object.
Figure 2:
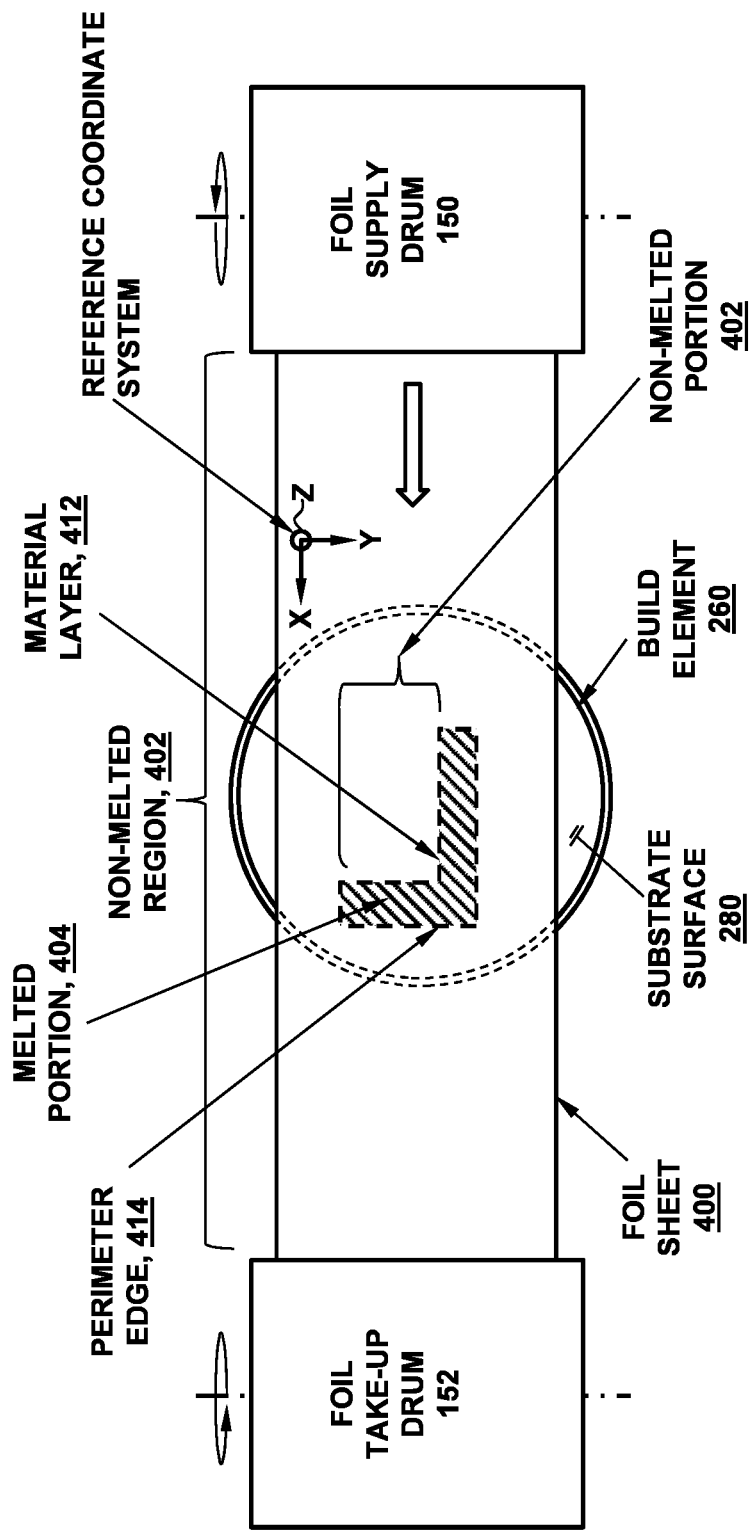
FIG. 2 is a top view of a foil sheet extending between a foil supply drum and a foil take-up drum and supported over a substrate surface of a build element (e.g., a build plate) over which the foil sheet is melted by a melting energy source to incrementally form a stack of material layers for manufacturing the object in accordance with the digital definition.
Figure 18:
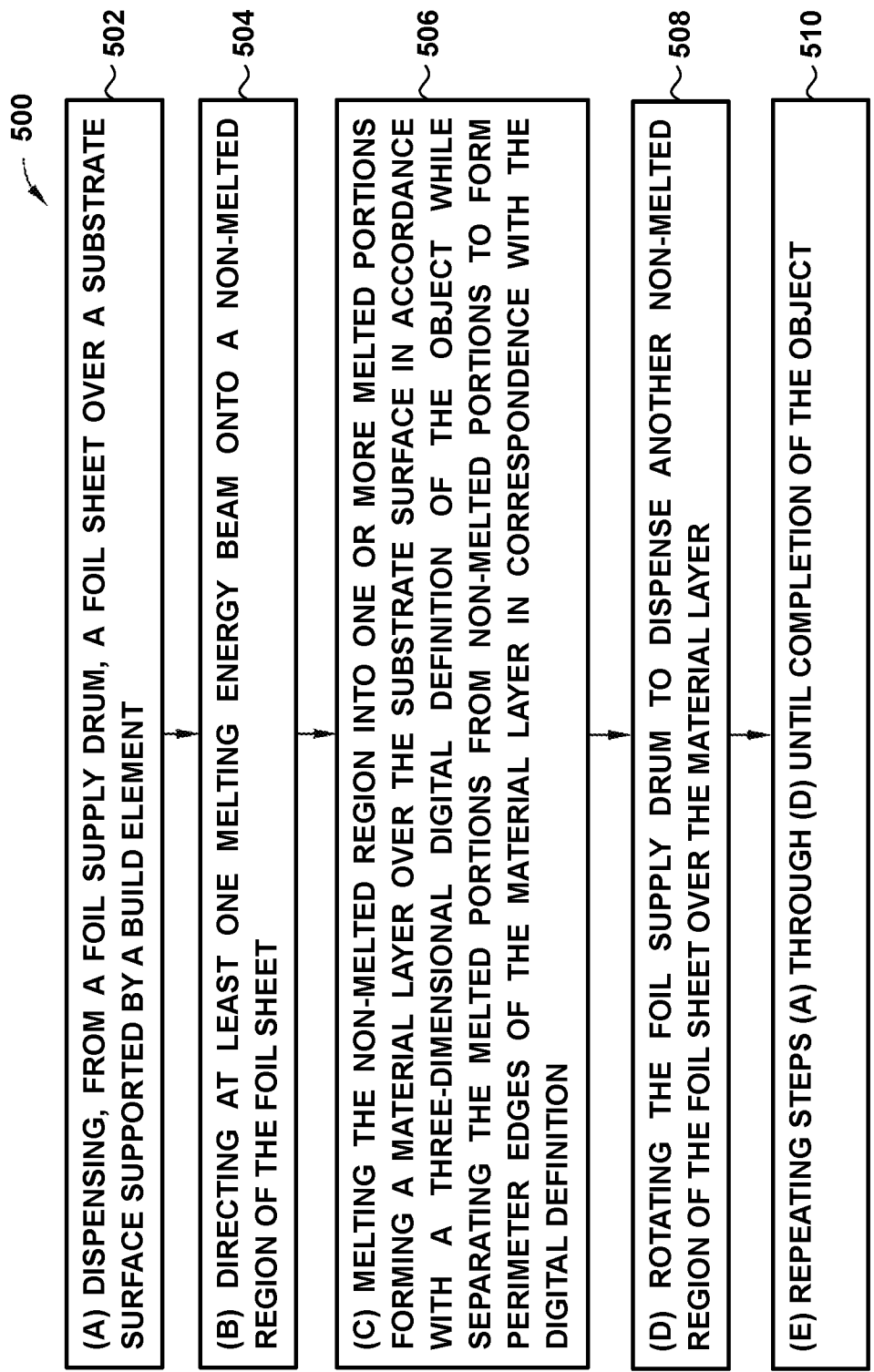
FIG. 18 is a flow chart of operations included in a method of additively manufacturing an object.

Referring generally to FIGS. 1-2 with additional reference to FIGS. 3-17, disclosed is an additive manufacturing system 100 for manufacturing an object 416 as a net-shaped part based on a three-dimensional digital definition 306 of the object 416. The additive manufacturing system 100 may be described as a layered foil fusion manufacturing system. Although described in the context of manufacturing a single object 416, multiple objects may be simultaneously manufactured in side-by-side relation to each other using the presently-disclosed additive manufacturing system 100 and method 500 (FIG. 18).

The manufacturing system 100 includes at least one foil supply drum 150 configured to be rotated for dispensing a foil sheet 400 over a substrate surface 280. The foil sheet 400 may be a continuous foil sheet 400 formed of any material such as a metallic material including, but not limited to, magnesium, aluminum, steel, titanium, inconel, cobalt, tungsten, or any one a variety of other metallic materials or alloys. The foil sheet may be provided in a foil thickness of from 0.001 to 0.008 inch or more. The foil sheet 400 is of uniform thickness and uniform density which ensures homogenous mechanical properties of the completed object 416. The substrate surface 280 may be described as the surface onto which a material layer 412 is applied. A build element 260 may be configured as build plate 264 which has a substrate surface 280. In other examples, a build element 260 may have two or more substrate surface 280 which may receive multiple material layers 412 applied by the presently-disclosed manufacturing system 100 for forming an object 416. The surface of the initial material layer 412 applied to a build element 260 becomes the substrate surface 280 of the next material layer 412, as described in greater detail below.

The manufacturing system 100 includes at least one melting energy source 180 configured to direct at least one melting energy beam 182 onto a non-melted region 402 of the foil sheet 400 located over the substrate surface 280. As shown in FIG. 2, a non-melted region 402 comprises the region of the foil sheet 400 prior to selectively melting into melted portions 404 onto the substrate surface 280 to form a material layer 412 of the object 416. The non-melted region 402 may be oriented parallel to the substrate surface 280. Also shown in FIG. 2 is a reference coordinate system by which the presently disclosed manufacturing system 100 is described. In the present disclosure, the X axis of the reference coordinate system is oriented parallel to the lengthwise direction of the foil sheet 400 in the non-melted region 402. The Y axis is perpendicular to the X axis and parallel to the foil sheet 400 within the non-melted region 402. The Z axis is perpendicular to the foil sheet 400 within the non-melted region 402.

As shown in FIG. 1, the manufacturing system 100 additionally includes a processor 300 configured to execute computable readable program instructions 304 based on the three-dimensional digital definition 306 of the object 416. The processor 300 may include or may function as one or more controllers configured to control the components of the manufacturing system 100. For example, the processor 300 controls the one or more melting energy sources 180 emitting one or more melting energy beams 182 to selectively melt at least some of the non-melted region 402 into melted portions 404 to thereby form a material layer 412 of the object 416 onto the substrate surface 280 while simultaneously separating or cutting the melted portions 404 from non-melted portions 406 of the foil sheet 400. The one or more melting energy beams 182 are controlled in a manner to separate or cut the melted portions 404 from the non-melted portions 406 to form the perimeter edges 414 of the material layers 412 in accordance with the digital definition 306 of the object 416. In some examples, after the formation of each material layer 412, the processor 300 may command vertical translation (e.g., along the Z axis) of the foil supply drum 150 (e.g., via a linear drive mechanism described below) and/or the build element 260 in a manner to vertically separate the foil sheet 400 from the most recently applied material layer 412. In some examples, the foil sheet 400 may be vertically separated from the material layer 412 by a distance of no less than the foil thickness. In addition, after the formation of each material layer 412, the processor 300 may command rotation of the foil supply drum 150 (e.g., via a drum rotation motor—not shown) for dispensing an additional length (e.g., another non-melted region 402) of the foil sheet 400 (e.g., along the X axis) over the most recently applied material layer 412 in preparation for the melting of a new material layer 412 onto the most recently applied material layer 412.

The manufacturing system 100 includes at least one foil take-up drum 152 as shown in FIGS. 3, 5-11, and 17, and which forms part of a foil application head 120. The foil take-up drum 152 may be commanded by the processor 300 to be rotated in synchronization with the foil supply drum 150. The foil supply drum 150 and the foil take-up drum 152 collectively define a foil drum set. The foil supply drum 150 and the foil take-up drum 152 may be rotated (e.g., respectively via a drum rotation motor—not shown) in synchronization with each other during which the foil take-up drum 152 takes up the non-melted portions 406 of the foil sheet 400 during dispensing of the foil sheet 400 from the foil supply drum 150 as the foil sheet 400 is advanced over the substrate surface 280 after the application of each one of the material layers 412. The foil supply drum 150 and foil take-up drum 152 may be rotated in a manner maintaining tension in the non-melted region 402 of the foil sheet 400 (e.g., FIG. 2) to prevent sagging of the foil sheet 400 which may interfere with accurate melting of the foil sheet to form the material layers 412 and may also interfere with the advancement of the foil sheet 400 or with in-plane rotation or translation of the foil sheet 400 in response to movement of the foil application head 120 relative to the build element 260.

In the example of the manufacturing system 100 in FIGS. 1-5 and 7-8, the foil supply drum 150 and the foil take-up drum 152 may be located on opposite sides of the build element 260 or build plate 264. However, the foil supply drum 150 and the foil take-up drum 152 may be mounted at any location relative to each other. For example, the foil supply drum 150 and the foil take-up drum 152 may be stacked on top of each other (e.g., FIG. 17). Alternatively, the foil supply drum 150 and the foil take-up drum 152 may be arranged in side-by-side relation to each other (not shown). In addition, the foil supply drum 150 and/or the foil take-up drum 152 may be mounted such that the orientation of the foil sheet 400 on the foil supply drum 150 or foil take-up drum 152 is different than the orientation of the non-melted region 402 over the substrate surface 280. For example, the foil supply drum 150 and/or the foil take-up drum 152 may be mounted such that the rotational axis of the foil supply drum 150 and/or the foil take-up drum 152 is non-parallel to the X-Y plane (e.g., FIG. 2) of the non-melted region 402. In such an arrangement, the foil sheet 400 may be routed respectively from and to the foil supply drum 150 and foil take-up drum 152 by a system of guide rollers 132 for changing the orientation of the foil sheet 400 as the foil sheet 400 moves from the foil supply drum 150 to the substrate surface 280, and for changing the orientation of the foil sheet 400 as the foil sheet 400 moves from the substrate surface 280 to the foil take-up drum 152. The system of guide rollers 132 may maintain the non-melted region 402 of the foil sheet 400 in constant horizontal orientation over the substrate surface 280.

The processor 300 is configured to control the rotation and static position of the foil supply drum 150 and the foil take-up drum 152 to support the non-melted region 402 of the foil sheet 400 in a tensioned, non-sagging manner over the substrate surface 280. The system of guide rollers 132 may assist in maintaining tension in the non-melted region 402. The processor 300 may command the synchronized rotation of the foil supply drum 150 and the foil take-up drum 152 to cause advancement of the foil sheet 400 across the substrate surface 280 in a pulsing manner between the application of one or more material layers 412. As mentioned above, the processor 300 is configured to control the operation of the manufacturing system 100 by executing computable readable program instructions 304 (e.g., a numerical-control (NC) program) which may be stored in a memory 302 that is communicatively coupled to the processor 300. The computer readable program instructions 304 facilitate the manufacturing of the object 416 based on the three-dimensional digital definition 306 of the object 416. The digital definition 306 may be a computer-aided-design (CAD) model 308 of the object 416. The memory 302 may store a plurality of different sets of computable readable program instructions 304, each set corresponding to a unique digital definition 306 of an object 416 that may be manufactured by the manufacturing system 100.

In some examples of the manufacturing system 100, the foil supply drum 150 and the foil take-up drum 152 may be respectively mounted on a pair of material tracks 172 of a material track system 170 (e.g., FIGS. 3-8). The pair of material tracks 172 may be located on opposite sides of the build element 260 and may respectively support the foil supply drum 150 and the foil take-up drum 152 via drum brackets 174. The manufacturing system 100 may include a mounting frame 122 (FIG. 1) to which the material track system 170 may be coupled. For examples where the foil sheet 400 is temporarily vertically separated from (e.g., translated above) the most recently applied material layer 412, the material track system 170 of the foil supply drum 150 and foil take-up drum 152 may be lifted (e.g., via a drive mechanism such as a screw drive—not shown) under command of the processor 300, to allow for advancement of the foil sheet 400 over the most recently applied material layer 412 and/or to allow for lateral translation (e.g., in the Y direction) of the foil sheet 400 relative to the substrate surface 280 and/or to allow for rotation of the foil sheet 400 (e.g., about the Z axis). The foil supply drum 150 and the foil take-up drum 152 may be temporarily raised by a relatively small distance (e.g., less than 0.5 inch) to temporarily raise the foil sheet 400 above the level of the most recently applied material layer 412, at which point the foil supply drum 150 and the foil take-up drum 152 may be rotated in a synchronized manner under command of the processor 300 to move a new non-melted region 402 of the foil sheet 400 into position over the substrate surface 280, after which the foil supply drum 150 and foil take-up drum 152 may be lowered to place the non-melted region 402 of the foil sheet 400 slightly above or in direct physical contact with the substrate surface 280 of the most recently applied material layer 412.

Alternatively or additionally, the build element 260 or build plate 264 (e.g., FIGS. 10-11) may be lowered in order to provide temporary vertical separation between the foil sheet 400 and the most recently applied material layer 412. Although not shown, the build element 260 may be movable by a linear drive mechanism (not shown) under command of the processor 300. In some examples described below, the build element 260 may be configured to be rotated (e.g., FIGS. 10-11) about the Z-axis between the application of one or more material layers 412. As mentioned above, precise vertical positioning of the build element 260 (e.g., build plate 264) and/or the foil supply drum 150 and foil take-up drum 152 may be performed by the above-mentioned linear drive mechanism (not shown) which may be configured as a screw drive, a ball screw, a lead screw, or an acme screw coupled to a rotational motor such as a stepper motor commanded by the processor 300.

As mentioned above, the manufacturing system 100 includes at least one melting energy source 180 controlled by the processor 300 and configured to direct one or more melting energy beams 182 onto the non-melted region 402 of the foil sheet 400 located over the substrate surface 280. For example, a manufacturing system 100 may include two or more melting energy sources 180 such as an array (e.g., a linear array) of melting energy sources 180 controlled by the processor 300 and located above the build plate 264 and configured to direct the emission of multiple melting energy beams 182 onto the foil sheet 400. The processor 300 dynamically controls the direction of the melting energy beams 182 in a manner controlling the movement and positioning of one or more melting spots (not shown) where the melting energy beams 182 intersect the foil sheet 400. A melting spot may have a diameter of 50-300 microns or larger. As mentioned above, the melting spot of each melting energy beam 182 is configured to melt selected portions of the foil sheet 400, and separate or cut melted portions 404 from non-melted portions 406 to thereby form a material layer 412 of the object 416 onto the build plate 264 or onto a previously formed material layer 412 to incrementally manufacture the object 416 in correspondence with the digital definition 306 of the object 416. Each one of the melting energy beams 182 may act as a heat source for locally heating and melting a portion of the foil sheet 400. One or more of the melting energy sources 180 may be configured as a laser device, as an electron beam device, or in other configurations. An electron beam device may provide faster melting times than a laser device. However, an electron beam device may require operation in a vacuum. In some examples, the processor 300 may control the melting energy sources 180 to cause the melting energy beams 182 to sweep in a back-and-forth motion and/or in a side-to-side motion across the foil sheet 400. The manufacturing system 100 may optionally include laser optic devices (not shown) for controlling the diameter of the melting spot of each melting energy beam 182 and/or for controlling the directional sweeping motion of the melting energy beams 182.

Figure 6:
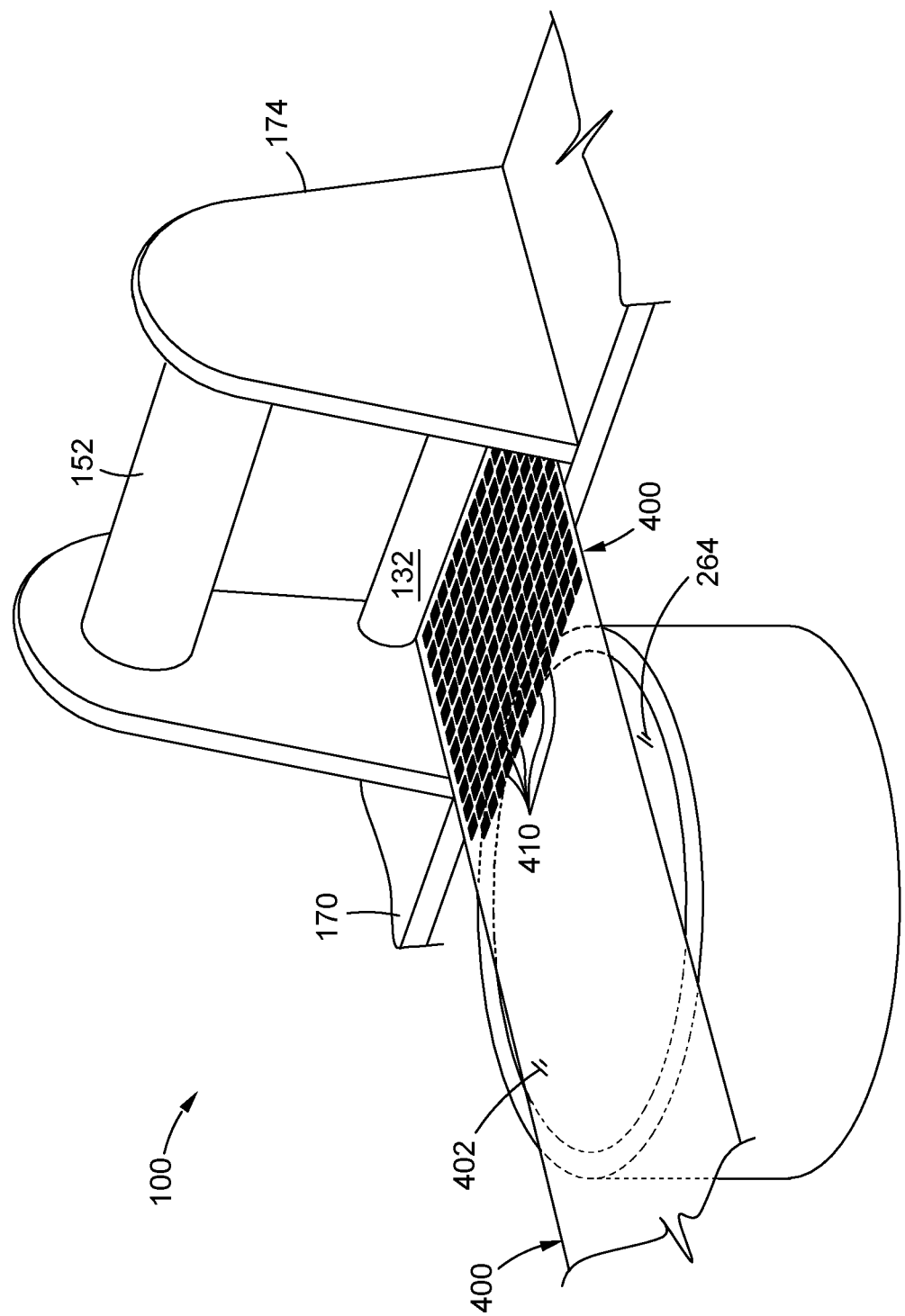
FIG. 6 is a perspective view of a portion of foil sheet melted into in a melt pattern of discrete melt segments.
Figure 7:
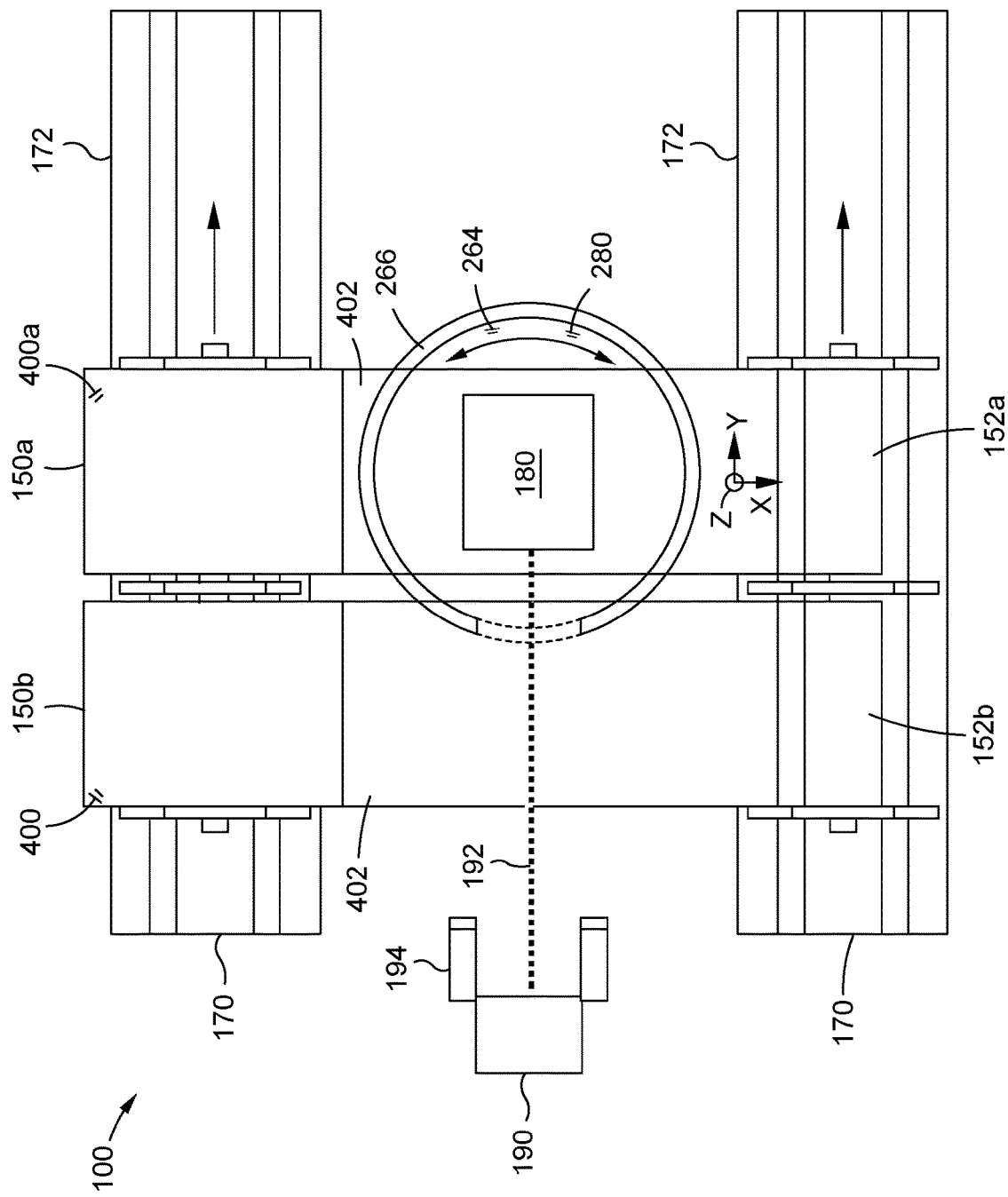
FIG. 7 is a top view of the manufacturing system of FIG. 5 and illustrating a finishing energy source emitting a finishing energy beam toward the object.
Figure 8:
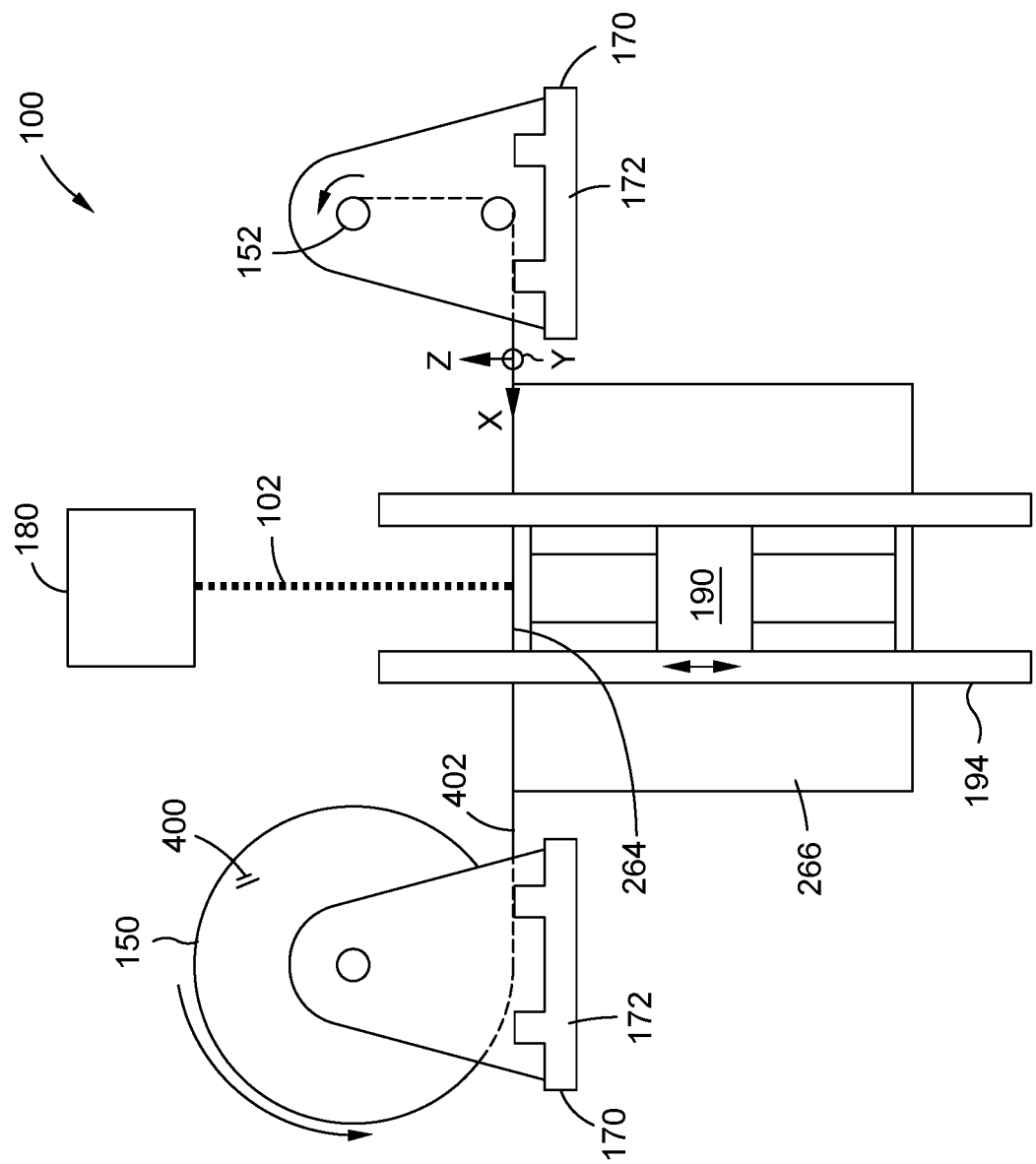
FIG. 8 is a side view of the manufacturing system of FIG. 7.

Referring briefly to FIG. 6, in some examples of the manufacturing system 100, the processor 300 may cause one or more of the melting energy sources 180 to direct the one or more melting energy beams 182 onto the non-melted region 402 of the foil sheet 400 in a manner forming a melt pattern 408 of discrete melt segments 410 during the forming of a material layer 412. For example, the discrete melt segments 410 may be formed in a dot matrix pattern or in a checkerboard pattern. The discrete melt segments 410 may be spaced apart by non-melted portions 406 (e.g., non-melted strips) which may intersect to form a lattice of non-melted portions 406. The melt segments 410 may be formed in any one a variety of shapes including in an orthogonal shape such as cube and/or in round shape such as sphere or cylinder. Some of the melt segments 410 may be melted during successive pulses of movements of the foil sheet 400 relative the substrate surface 280 (e.g., of the build plate 264). For example, one portion of the material layer 412 may be initially formed by melting some of the melt segments 410 required for forming a material layer 412, after which the build element 260 (e.g., build plate 264) or foil application head 120 (e.g., the foil supply drum, foil take-up drum 152 and optionally the melting energy source 180) may be translated or rotated into a different position or orientation prior to melting the remaining portion of melt segments 410 required to complete the material layer 412. The web of non-melted strips may allow tension to be maintained in the foil sheet 400 between the foil supply drum 150 and the foil take-up drum. Advantageously, melting the foil sheet 400 in a melt pattern 408 of discrete melt segments 410 may provide a means for managing thermal stress and/or distortion of the foil sheet 400 and may also optimize usage of the foil material.

In some examples of the manufacturing system 100 (e.g., FIGS. 2-8), a build chamber 266 may be included to at least partially surround the substrate surface 280 of the build element 260 and the object 416. Such a build chamber 266 may be configured to at least partially contain inert gas 222 at least at a location surrounding the molten foil material of the melted portions 404. A build chamber 266 may be configured to contain inert gas 222 such as Argon in the area surrounding the molten foil material as a means to prevent oxygen from contacting the molten foil material. Inert gas 222 may avoid the oxidation of the molten foil material which may otherwise result in a reduction in the mechanical properties (e.g., the strength properties) of the completed object 416. Inert gas 222 may be used with foil sheets 400 formed of any material composition, including material compositions such as titanium and aluminum that are reactive at high temperatures.

As mentioned above, the manufacturing system 100 may include a mounting frame 122 (FIG. 1) configured to support the manufacturing system components such as the foil supply drum 150, the foil take-up drum 152, and the melting energy source 180 which, in some examples, may collectively define a foil application head 120 as shown in FIGS. 9-13. The foil application head 120 may be coupled via a mounting frame 122 to a head moving mechanism 106 such as a gantry 108 (e.g., an overhead gantry 108—FIGS. 9-11) or to a robotic arm 112 (e.g., FIG. 13) of a robotic device 110. Regardless of the configuration, the head moving mechanism 106 may be configured to translate the foil application head 120 over the substrate surface 280 along the lengthwise direction (e.g., parallel to the X axis) of the foil sheet 400 while dispensing the foil sheet 400 from the foil supply drum 150 at the same rate at which the foil application head 120 is translated relative to the substrate surface 280. In some examples, the mounting frame 122 (not shown) may be a parallel pair of plates, an assembly of struts, or any one a variety of other structural configurations. As described in greater detail below, the manufacturing system 100 may include additional components that may be coupled to the mounting frame 122 or to the head moving mechanism 106, including components such as an inert gas source 220, a gas blowing device 240, a tenting structure 224 for containing inert gas 222, a preheater, and/or other components described below.

The processor 300 may command the head moving mechanism 106 to move the foil application head 120 along any one of a variety of different directions or combination of directions during the manufacturing of an object 416. For example, in FIG. 9, the head moving mechanism 106 may be configured as a gantry 108 configured to translate the foil application head 120 along a direction locally parallel to the substrate surface 280 during or between the application of one or more material layers 412. The gantry 108 may include a horizontal beam 108a supported by a pair of vertical beams 108b. The foil application head 120 may be coupled to the horizontal beam 108a and may be rotatable about a vertical axis (e.g., Z axis). The horizontal beam 108a may have a linear drive mechanism (not shown) such as a screw drive coupled to a motor that may be commanded by the processor 300 for horizontal translation of the horizontal beam 108a and therefore the foil application head 120. The opposing ends of the horizontal beam 108a may be respectively coupled to the pair of vertical beams 108b and may be movable in unison with each other for vertical translation of the horizontal beam 108a and therefore the foil application head 120.

In an alternative embodiment, the head moving mechanism 106 may be configured as a robotic device 110 (FIG. 13) having a robot base 114 and one or more robotic arms 112 to which the mounting frame 122 of the foil application head 120 may be coupled. The robot base 114 may be rotatable about a vertical axis (FIG. 10) and/or the robot base 114 may be translatable (FIG. 10) in the horizontal plane. The processor 300 may command the robotic device 110 to translate the foil application head 120 along the substrate surface 280 (e.g., in an in-plane direction or parallel to the X axis) during or between the application of one or more material layers 412. The head moving mechanism 106 (e.g., a gantry 108, a robotic device 110) may also be configured to translate the foil application head 120 along a direction locally perpendicular to the substrate surface 280 such as along a direction parallel to the Z axis (e.g., FIG. 2). The head moving mechanism 106 may also be configured to rotate the foil application head 120 about an axis perpendicular to the substrate surface 280 or along a direction parallel to the Z axis.

Figure 9:
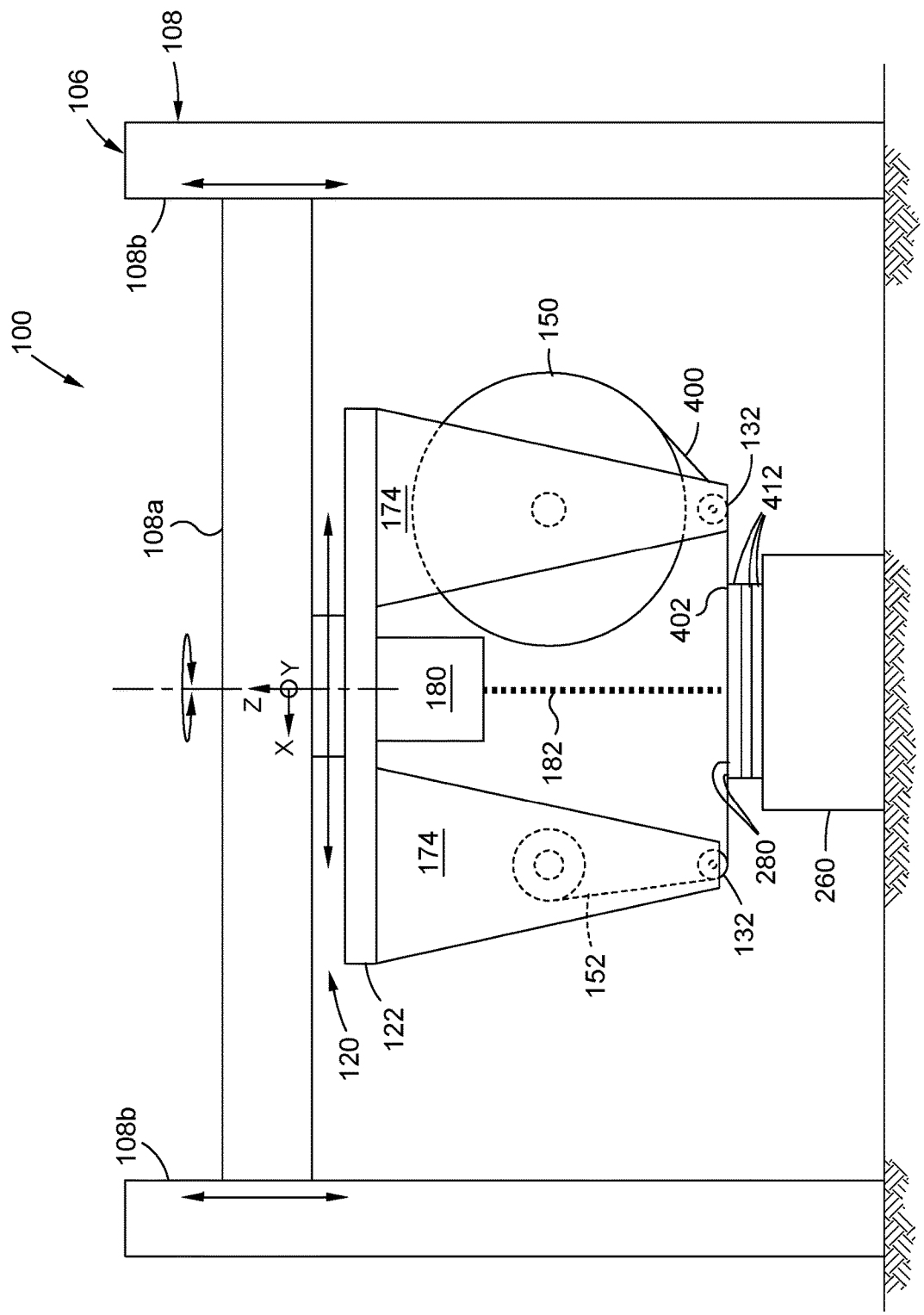
FIG. 9 is an example of the manufacturing system in which the foil supply drum, the foil take-up drum, and the melting energy source collectively define a foil application head that is coupled to a head moving mechanism configured as a gantry.

For the gantry 108 shown in FIG. 9, the mounting frame 122 may include a head rotation motor (not shown) configured to rotate the foil application head 120 about the Z axis. The head moving mechanism 106 may move the foil application head 120 as a means to adjust or change the horizontal position, the vertical location, and/or the clocking orientation of the foil sheet 400 relative to the substrate surface 280 prior or between the application of one or more material layers 412. Regardless of the configuration of the head moving mechanism 106, the processor 300 is configured to command the head moving mechanism 106 to move the foil application head 120 such that at the completion of movement and prior to the application of a material layer 412, the non-melted region 402 of the foil sheet 400 is oriented approximately (e.g., within 10 degrees) horizontally and is located over the substrate surface 280 onto which material layers 412 are to be applied. However, as described in greater detail below, the manufacturing system 100 may be configured move the build element 260 as an alternative to or in addition to movement of the foil application head 120. For example, the foil application head 120 may be fixed or stationary, and the build element 260 may be movable. Alternatively, the foil application head 120 may be movable and the build element 260 may be fixed or stationary. In still further embodiments, both the foil application head 120 and the build element 260 may be movable.

In some examples of the manufacturing system 100, the foil application head 120 includes a dispensing mechanism 130 (e.g., FIGS. 13-17) configured to receive the foil sheet 400 dispensed from the foil supply drum 150. The dispensing mechanism 130 may directly apply the foil sheet 400 onto the substrate surface 280 during movement of the foil application head 120 over the substrate surface 280 along the lengthwise direction of the foil sheet 400. The dispensing mechanism 130 may be provided as a dispensing shoe 134 and/or as one or more guide rollers 132 (e.g., FIG. 17) configured to directly apply the foil sheet 400 onto a substrate surface 280 by pressuring the foil sheet 400 into direct physical contact with the substrate surface 280.

As mentioned above, in some examples (e.g., FIGS. 10-11) of the manufacturing system 100, the build element 260 may be coupled to an element moving mechanism 282 configured to move the build element 260 under command of the processor 300. For example, the element moving mechanism 282 may be configured as a robotic device 110 having a robotic arm 112 supporting a build element 260 having a plurality of substrate surfaces 280 onto which material layers 412 may be applied. In another example, the element moving mechanism 282 may be configured as a rotatable mandrel (not shown) comprising or supporting a build element 260 having one or more substrate surfaces 280 or containing a generally cylindrical or rounded substrate surface (not shown) onto which material layers 412 may be applied. In some examples, the build element 260 may have at least two substrate surfaces 280 that are non-co-planar and/or are non-parallel to each other. In this regard, the build element 260 may have a three-dimensional seed shape 262 (e.g., a cube, a cylinder, a sphere, etc.) having a plurality of substrate surfaces 280 that are either non-co-planar or non-parallel to each other and that each serve as a substrate surface 280 onto which material layers 412 may be applied to manufacture an object 416. The build element 260 may be coupled to the element moving mechanism 282 for rotation and/or translation of the build element 260 under command of the processor 300. In this regard, the build element 260 may be rotated and/or translated in a manner such that at any time, at least one of the substrate surfaces 280 faces upwardly and is positioned underneath the foil application head 120. In addition, the element moving mechanism 282 may be configured to orient the build element 260 such that the substrate surface 280 is horizontally oriented and/or is substantially parallel to the foil sheet 400.

The element moving mechanism 282 (e.g., robotic device 110—FIGS. 10-11, mandrel, etc.) may be configured to move the build element 260 in any one a variety of directions. For example, the element moving mechanism 282 may be configured to laterally translate the build element 260 along a direction locally parallel (e.g., parallel to the X-Y plane) to the non-melted region 402 of the foil sheet 400. The element moving mechanism 282 may also be configured to vertically move the build element 260 along a direction locally perpendicular (e.g., parallel to the Z axis) to the non-melted region 402 of the foil sheet 400. The element moving mechanism 282 may also be configured to rotate the build element 260 about any axis such that any one of the substrate surfaces 280 faces upwardly and is horizontally oriented in preparation for receiving a material layer 412 from the foil application head 120.

The manufacturing system 100 may include any number of foil supply drums 150 containing different configurations of foil sheet 400. Different configurations of the foil sheet 400 may include different material compositions, (e.g., aluminum, steel, titanium, etc.), different levels of foil quality of the same material composition, different foil thicknesses, and/or different widths of the foil sheet 400. A foil sheet 400 may also be provided as a multi-strip array of foil strips (e.g., less than 1 inch wide). Different material configurations may be used in different layers of the same object 416. For example, thicker and/or lower quality and therefore less expensive foil sheet 400 may be used for forming material layers 412 that are built up to form structural supports (not shown) that may be required for forming other geometric features of the same object 416 during manufacturing of the object 416 using the manufacturing system 100.

Figure 5:
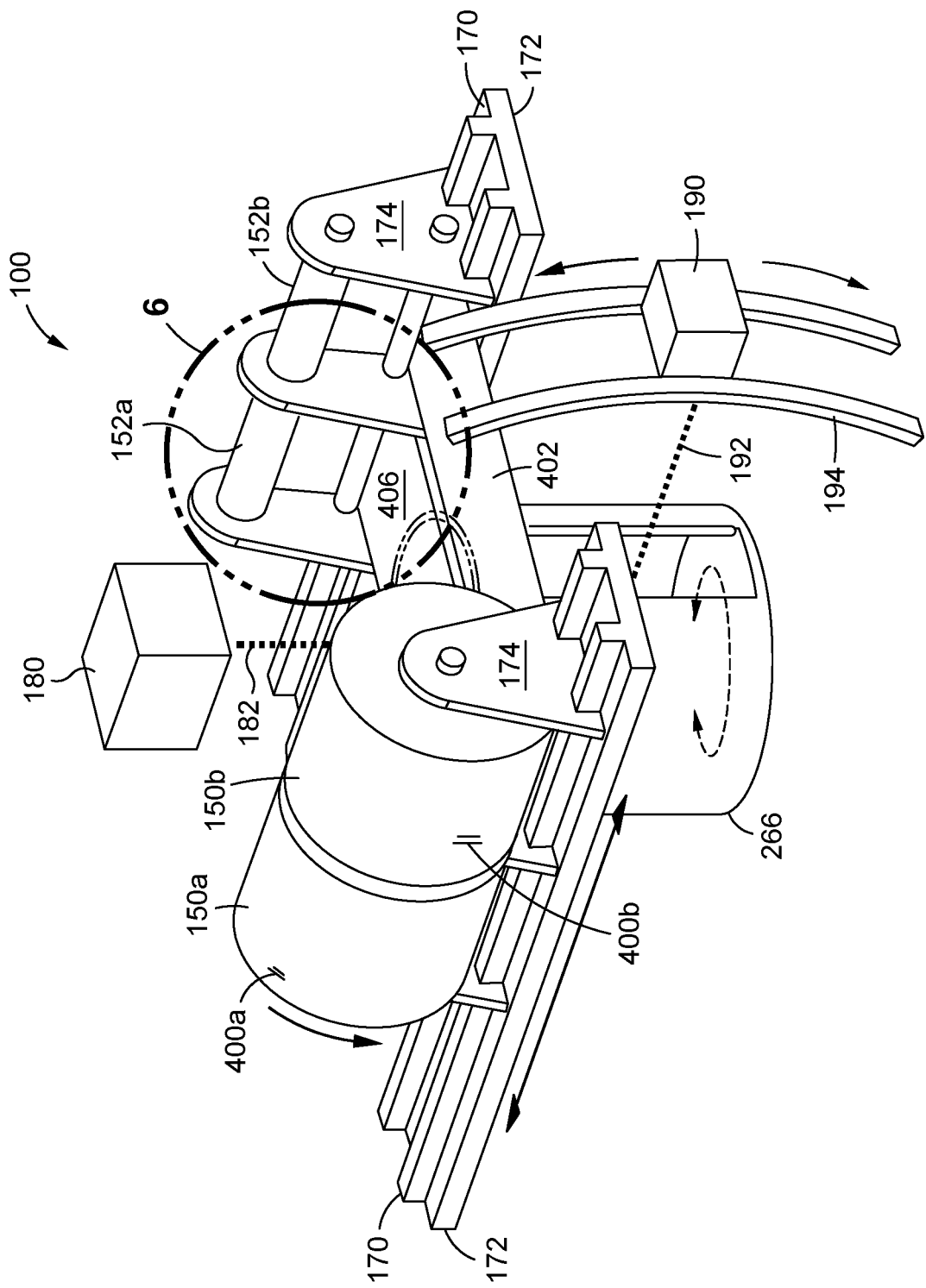
FIG. 5 is a further perspective view of the manufacturing system of FIG. 4.

FIGS. 3, 5 and, 7 illustrate an example of a manufacturing system 100 having a first foil supply drum 150a and a second foil supply drum 150b configured to respectively dispense a first foil sheet 400a and a second foil sheet 400b. The second foil sheet 400b may be the same material configuration or a different material configuration than the first foil sheet 400a. The first foil supply drum 150a may be part of a first drum set which may include a first foil take-up drum 152a. Likewise, the second foil supply drum 150b may be part of a second drum set that may include a second foil take-up drum 152b. The processor 300 may command the first foil supply drum 150a and the second foil supply drum 150b to dispense the first foil sheet 400a and the second foil sheet 400b at different times during the manufacturing of the object 416 for forming different material layers 412 of the object 416. For example, the processor 300 may command the first foil supply drum 150a to dispense the first foil sheet 400a for forming the first several material layers 412 of the object 416, and may command the second foil supply drum 150b to dispense the second foil sheet 400b for forming the remaining material layers 412 of the object 416.

As mentioned above, in one example, the manufacturing system 100 may include the above-described material track system 170 upon which any number or foil supply drums 150 and foil take-up drums 152 may be mounted. For example, in FIGS. 3 and 5-8, the material track system 170 may comprise a pair of material tracks 172 located on opposite sides of the build element 260 for respectively supporting the first foil drum set (e.g., the first foil supply drum 150a and the first foil take-up drum 152a) and the second foil drum set (e.g., the second foil supply drum 150b and the second foil take-up drum 15sb). Each one of the drums 150a, 150b, 152a, 152b may be coupled to a linear drive mechanism (not shown) as described above for laterally moving, under command of the processor 300, the first drum set and the second drum set along the material track system 170 as a means to position either the first foil sheet 400a or the second foil sheet 400b over the substrate surface 280 for the application of one or more material layers 412 of either the first foil sheet 400a or the second foil sheet 400b.

The manufacturing system 100 may further include at least one finishing energy source 190 configured to emit at least one finishing energy beam 192 as shown in FIGS. 3, 5, 7 and 8. The finishing energy beam 192 may apply energy to the object 416 by locally heating one or more surfaces of the object 416 during and/or after manufacturing of the object 416. The finishing energy source 190 may be configured as one or more laser devices and/or one or more electron beam devices. In the example shown, the finishing energy source 190 may be supported on a finishing track system 194 which may be supported by the mounting frame 122 of the manufacturing system 100. The finishing track system 194 may facilitate translation and/or rotation of the finishing energy source 190 under command of the processor 300. In the example shown, the finishing track system 194 allows for translation of the finishing energy source 190 along a vertical direction. However, the finishing energy source 190 may be movable along any one a variety of directions in addition to or other than the vertical direction. The example manufacturing system 100 includes an opening in the build chamber 266 to provide line-of-sight access for the finishing energy beam 192 emitted from the finishing energy source 190 toward one or more surfaces of the object 416. The processor 300 may be configured to operate the finishing energy source 190 in a manner for performing any one a variety of operations on the object 416 during or after manufacturing of the object 416. For example, the finishing energy source 190 may be used for normalizing a thermal time history of the melted portions 404 of the object 416 to provide substantially uniform temperature distribution on the object 416 in the partially built state prior to the application of one or more additional material layers 412. The finishing energy source 190 may also be operated in a manner to locally pre-heat the substrate surface 280 prior to the application of one or more material layers 412, and/or to pre-heat the build chamber 266.

Additionally, the finishing energy source 190 may be operated in a manner to stress relieve the object 416 on the build plate 264 during manufacturing of the object 416 and/or after completion of the object 416. The application of the finishing energy beam 192 onto the object may reduce residual stress in the object surfaces. In addition, the finishing energy beam 192 may be operated in a manner to heat treat the object 416 to improve the mechanical properties such as by increasing the hardness and/or ultimate strength of the object 416. In addition, the finishing energy beam 192 may smooth the surfaces of the object 416 by locally re-melting the surfaces and allowing surface tension of the molten foil material to smooth irregularities that may exist at the object surfaces such as may occur due to offsets in the perimeter edges 414 of the individual material layers 412. In addition, the finishing energy beam 192 may fuse together the material layers 412 of the object 416 at the perimeter edges 414.

The manufacturing system 100 may include a preheater 200 (FIG. 1) configured to heat the foil sheet 400 prior to and/or during application of a material layer 412. In the example shown, the preheater 200 may be located above the foil sheet 400 proximate the area of the substrate surface 280. However, the preheater 200 may be mounted at any location. The manufacturing system 100 may include any number of preheaters 200 mounted in any one a variety of different locations. In the example shown, the preheater 200 may be mounted to the mounting frame 122 which may be part of the foil application head 120. Preheating of the foil sheet 400 by the preheater 200 may result an increase in the temperature of the foil sheet 400 prior to melting the foil sheet 400 to form a material layer 412. In this regard, preheating of the foil sheet 400 may reduce the amount of energy required for the melting energy beam 182 to melt the foil sheet 400, and may thereby increase the rate at which material layers 412 may be successively formed and fused together.

A preheater 200 may be provided in any one a variety of configurations. For example, the manufacturing system 100 may include one or more preheaters 200 configured as laser devices and/or an electron beam devices. Alternatively or additionally, a preheater 200 may be configured as a hot air heater for directing hot air toward the foil supply drum, the foil sheet 400, and/or the object 416. Still further, a preheater 200 may be configured as a plurality of heating elements circumferentially spaced around and coupled to the build element 260 (e.g., build plate 264) and/or build chamber 266 for maintaining the inert gas 222 within the build chamber 266 above a predetermined minimum temperature as a means to maintain the minimum temperature of the object 416 through convective heating. In another example, the manufacturing system 100 may include a preheater 200 configured as a convection oven (e.g., an environmental enclosure 102—FIG. 1) enclosing at least the build plate 264 and the object 416 for maintaining the object 416 above a minimum temperature. In a still further example, the preheater 200 may be configured as an induction furnace (not shown) configured to enclose one or more foil supply drums 150 and inductively heat the object 416 and the foil sheet 400 prior to melting into material layers 412. The manufacturing system 100 may also include one or more preheaters 200 configured to maintain the temperature of the object 416 in the build chamber 266 via radiation. The manufacturing system 100 may include other energy sources for maintaining the temperature of the build element 260 as a means to maintain a minimum temperature of the object 416.

Figure 15:
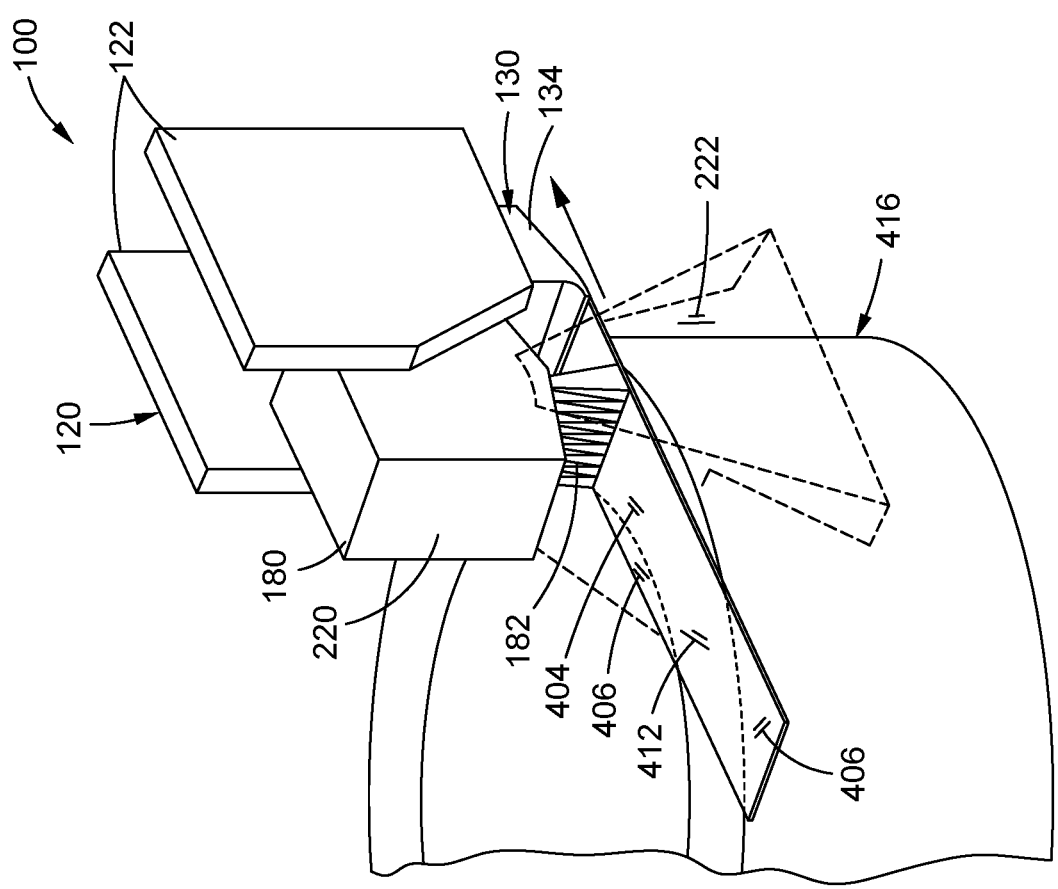
FIG. 15 is a perspective view of the foil application head of FIG. 14 showing an inert gas plume emitted by an inert gas source that may be included with the foil application head.
Figure 16:
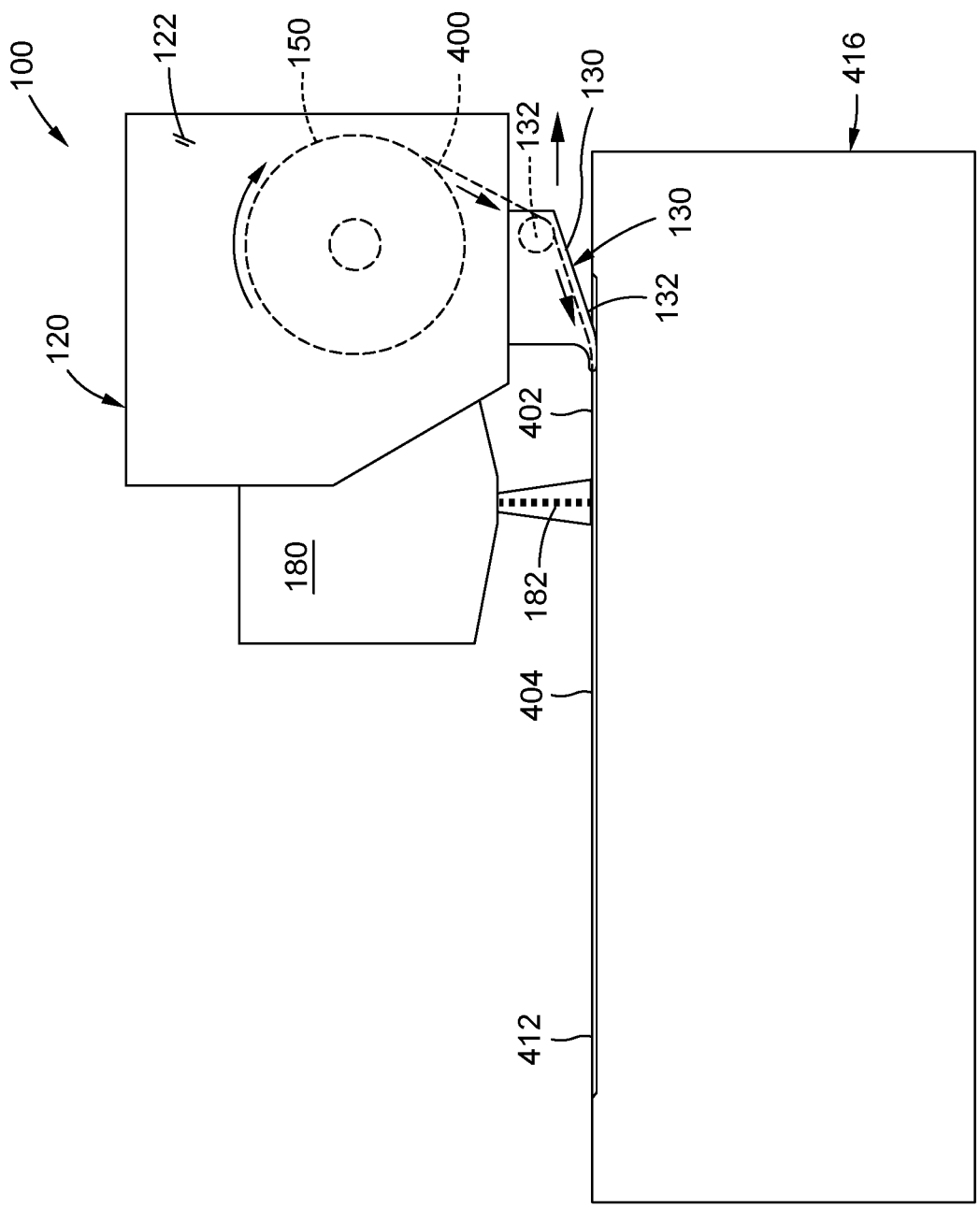
FIG. 16 is a side view of an example of a foil application head having a foil supply drum and a melting energy source for melting the foil sheet as the foil application head is translated over a substrate surface.
Figure 17:
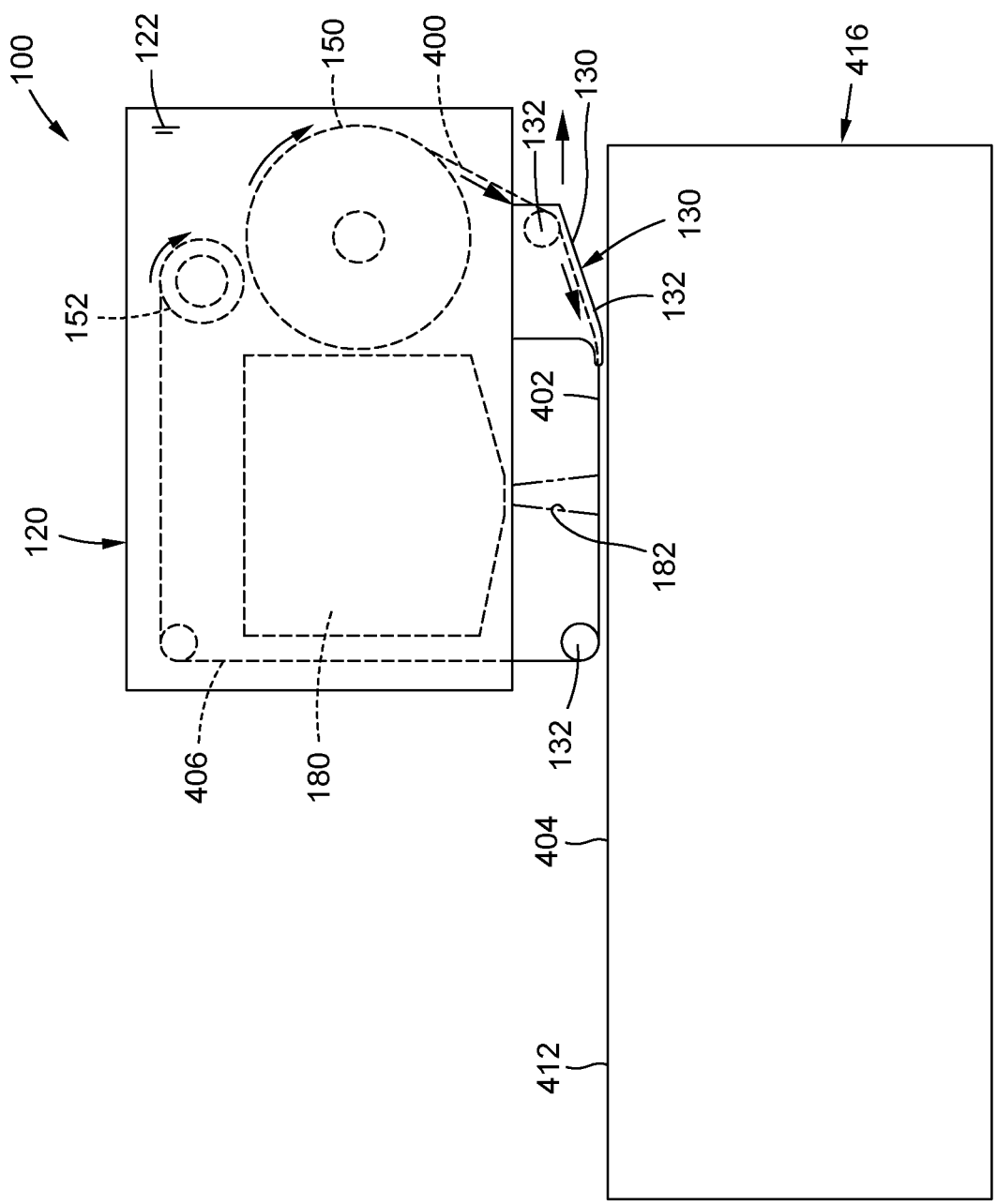
FIG. 17 is a side view of a further example of a foil application head having a foil supply drum and a foil take-up drum rotatable in synchronization with the foil supply drum for taking up the foil sheet containing non-melted portions.

The manufacturing system 100 may include an inert gas source 220 (FIG. 1) configured to emit inert gas 222 such as argon for surrounding the molten foil material to prevent oxygen from contacting the molten foil material to thereby prevent oxidation of the foil material in the molten state. The inert gas source 220 may be mounted to the mounting frame 122 of the foil application head 120. In the example of FIG. 15, the inert gas source 220 may emit inert gas 222 in a manner such that an inert gas plume surrounds at least the location where the foil sheet 400 is being melted into a material layer 412.

In some examples, the manufacturing system 100 may include a tenting structure 224 (FIG. 1) that may be included with the foil application head 120. The tenting structure 224 may be configured to surround the molten foil material and may optionally surround at least a portion of the melting energy beam 182. The tenting structure 224 may contain the inert gas 222 emitted by the inert gas source 220. The tenting structure 224 may be formed of any suitable rigid or flexible non-metallic and/or metallic material capable of at least partially containing inert gas 222 at least in the area surrounding the molten foil material. The inert gas source 220 may continuously emit inert gas 222, or emit inert gas 222 only during the melting of the foil sheet 400 while the melted portions 404 are in a molten state.

The inert gas source 220 may be configured to emit inert gas 222 at a temperature capable of maintaining the object 416 below a maximum temperature as a means to prevent overheating of the object 416 during and/or between the application of material layers 412. Alternatively, the manufacturing system 100 may including a cooling gas source (not shown) for emitting cooling gas (e.g., inert gas) for maintaining the temperature of the object 416 below a predetermined maximum.

The manufacturing system 100 may optionally include a gas blowing device 240 (FIG. 1) configured to blow gas (e.g., inert gas 222) toward the object 416 during the manufacturing process. For example, the inert gas source 220 may be configured to function as the gas blowing device 240 for blowing inert gas 222 toward the object 416 as a means to blow smoke and/or soot away from the melt area. Such smoke and/or soot may be generated as a byproduct of the melting of the foil sheet 400, and may interfere with the amount of melting energy provided by the melting energy beam 182 on the foil sheet 400. In addition, smoke and/or soot may the reduce the focus of a laser beam or an electron beam.

The manufacturing system 100 may optionally be at least partially enclosed within an environmental enclosure 102 (FIG. 1) as mentioned above. In one example, the environmental enclosure 102 may be filled with an inert gas 222 for preventing oxidation of the molten foil material during manufacturing of an object 416. Such an arrangement may be required for implementations in which the melting energy source 180 is an electron beam device and/or where the foil material is highly reactive (e.g., titanium). The environmental enclosure 102 may be fluidly coupled to a vacuum source 104 configured to generate at least a partial vacuum within the environmental enclosure 102. A vacuum within an environmental enclosure 102 may be required for implementations of the manufacturing system 100 in which one an electron beam provides the melting energy for melting the foil sheet 400.

Referring to FIG. 18, disclosed is a method 500 of additively manufacturing an object 416. The method includes step 502 (step a) of dispensing a foil sheet 400 over a substrate surface 280 supported by a build element 260. The foil sheet 400 may be dispensed in response to rotation of the foil supply drum 150 under command of the processor 300, as described above. For the initially applied material layer 412, the substrate surface 280 may be a surface of the build element 260. During the application of subsequent material layers 412, the substrate surface 280 may be the surface of the most recently applied material layer 412. Prior to initiating the manufacturing of an object 416, the method 500 may include at least partially surrounding the substrate surface 280 of the build element 260 with a build chamber 266. As described above, a build chamber 266 may be configured to contain inert gas 222 (e.g., argon) at least at a location surrounding molten foil material of the melted portions 404 to prevent oxygen from contacting the molten foil material to thereby avoid oxidation of the molten foil material which may reduce the mechanical properties of the object 416 when completed.

As described above, the foil supply drum 150 is part of a foil application head 120 which may include a foil take-up drum 152. For examples of the manufacturing system 100 that have a foil take-up drum 152, step 508 of rotating the foil supply drum 150 may include rotating the foil take-up drum 152 in synchronization with rotation of the foil supply drum 150 to wind up the foil sheet 400 on the foil take-up drum 152 during dispensing of the foil sheet 400 from the foil supply drum 150.

Figure 13:
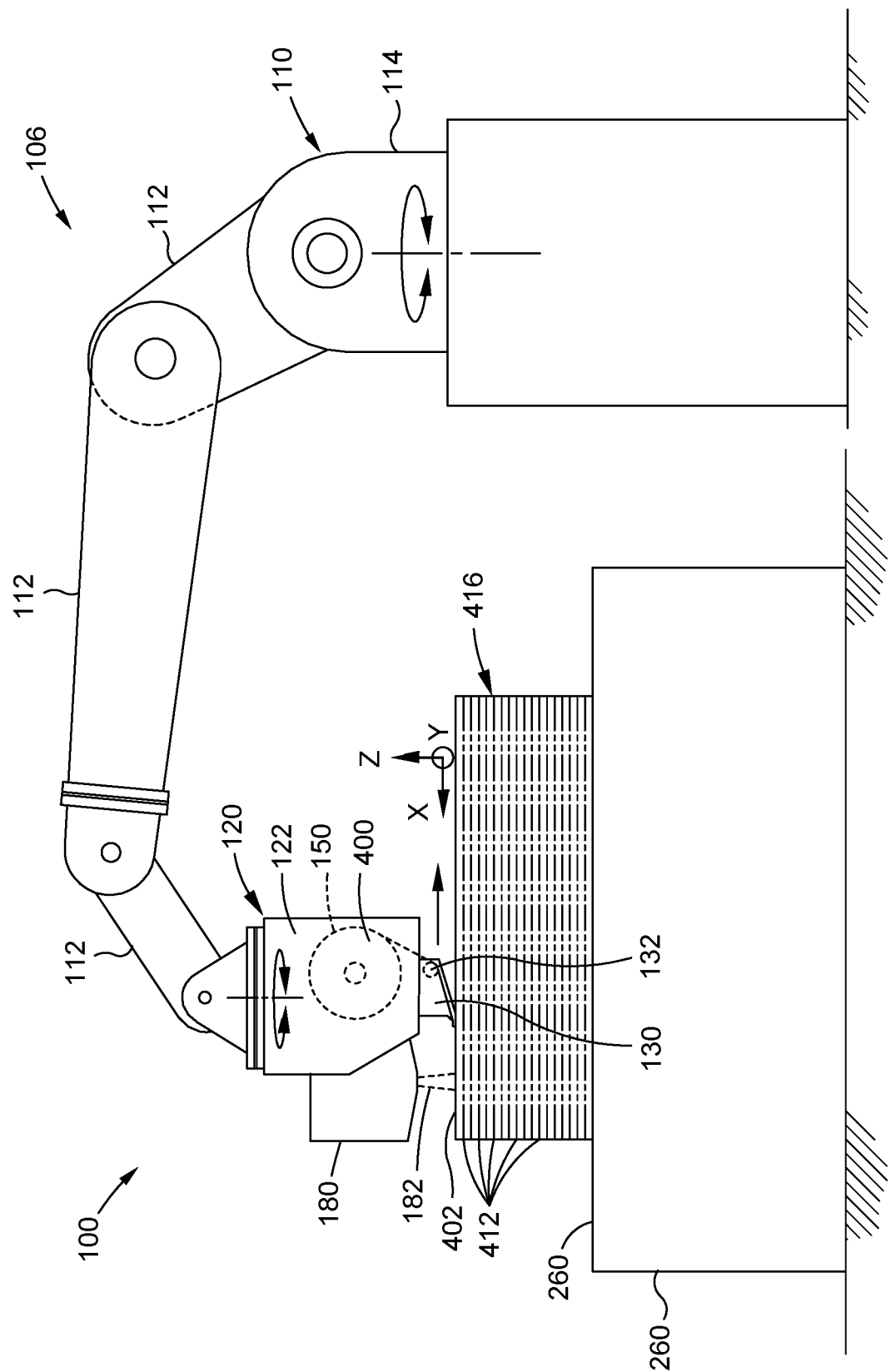
FIG. 13 is an example of a manufacturing system in which the foil application head is supported by a robotic device configured to translate the foil application head over the substrate surface while the foil application head dispenses a foil sheet for melting by the melting energy source into a material layer on the substrate surface of a stationary build element.
Figure 14:
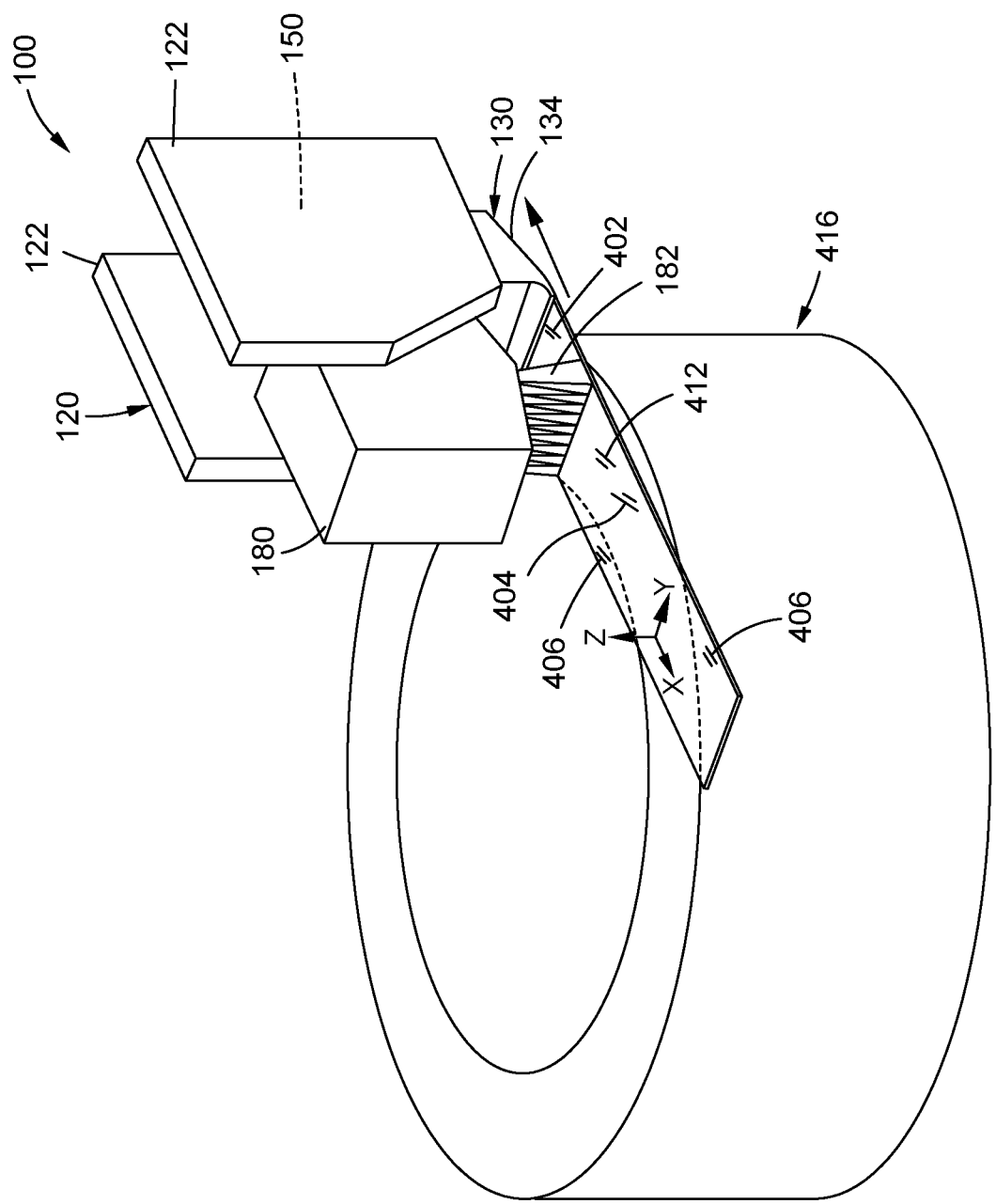
FIG. 14 is a perspective view of the foil application head of FIG. 13 applying a material layer during the manufacturing of an object having a cylindrical shape.

In some examples, the foil application head 120 may be coupled to a head moving mechanism 106 such as a gantry 108 (FIGS. 9-11) or a robotic device 110 (FIG. 13). In examples where the foil application head 120 is coupled to a head moving mechanism 106, step 502 of dispensing the foil sheet 400 over the substrate surface 280 may include translating the foil application head 120 over the substrate surface 280 along a lengthwise direction of the foil sheet 400 while dispensing the foil sheet 400 from the foil supply drum 150. Step 502 of dispensing the foil sheet 400 over the substrate surface 280 may include applying, using a dispensing mechanism 130 (FIGS. 13-17) of the foil application head 120, the foil sheet 400 onto the substrate surface 280 during movement of the foil application head 120 over the substrate surface 280. The foil sheet 400 dispensed from the foil supply drum 150 may be received at the dispensing mechanism 130. The dispensing mechanism 130 may be a dispensing shoe 134 or a guide roller 132 configured to directly apply the foil sheet 400 to the substrate by pressuring the foil sheet 400 into direct physical contact with the substrate surface 280.

As mentioned above, some examples of the manufacturing system 100 may include any number or foil supply drums 150 (e.g., FIGS. 3, 5 and 8) respectively containing any number of different material configurations of foil sheet 400. In one example of such an arrangement, step 502 of dispensing the foil sheet 400 over the substrate surface 280 may include dispensing, under command of the processor 300, either a first foil sheet 400a or a second foil sheet 400b respectively from a first foil supply drum 150a and a second foil supply drum 150b. The first foil sheet 400a and the second foil sheet 400b may be dispensed at different times during the manufacturing of the object 416 for forming different material layers 412 of the object 416. The first foil sheet 400a may have a different material configuration than the second foil sheet 400b. Dispensing the first foil sheet 400a and the second foil sheet 400b at different times during the manufacturing of the object 416 may require moving, between the application of one or more of the material layers 412, either the first foil drum set or the second foil drum set along a material track system 170 until either the first foil sheet 400a or the second foil sheet 400b is positioned over the substrate surface 280.

Step 504 (step b) of the method 500 includes directing at least one melting energy beam 182 onto a non-melted region 402 of the foil sheet 400 located over the substrate surface 280. As described above, the manufacturing system 100 includes one or more melting energy sources 180 configured to emit one or more melting energy beams 182. For example, the manufacturing system 100 may include two or more melting energy beams 182 arranged in an array of melting energy beams 182. Step 504 of directing the melting energy beam 182 onto the foil sheet 400 may include emitting at least one melting energy beam 182 from a laser device, an electron beam device, or a combination thereof. As mentioned above, the melting energy sources 180 may be controlled in a manner to sweep the melting energy beams 182 in a back-and-forth motion and/or side-to-side motion across the foil sheet 400. The method may employ the use of laser optic devices (not shown) to control the diameter of the melting spot of each melting energy beam.

Step 506 (step c) of the method 500 includes melting, using one or more melting energy beams 182, the non-melted region 402 into one or more melted portions 404 to form a material layer 412 over the substrate surface 280 in accordance with a three-dimensional digital definition 306 of the object 416. The process of forming a material layer 412 may include separating or cutting, using at least one melting energy beam, the melted portions 404 from the non-melted portions 406 to form the perimeter edges 414 of the material layer 412 in correspondence with the digital definition 306. After forming a material layer 412 and prior to further dispensing of the foil sheet 400, the method 500 may include vertically translating the foil supply drum 150 (and foil take-up drum 152 if included in the foil application head 120) and/or the build element 260 as a means to temporarily vertically separate the foil sheet 400 from the material layer 412 to allow for dispensing an additional non-melted region 402 of the foil sheet 400 over the substrate surface 280 in preparation for forming a new material layer 412 over the most recently applied material layer 412. After dispensing the foil sheet 400, the foil supply drum 150 and/or the build element 260 may be vertically translated back to their original position according to the desired spacing between the foil sheet 400 and the substrate surface 280. However, in other examples, the foil sheet 400 may be continuously supported in vertically spaced relation above the substrate surface 280, and may therefore not require vertical translation between the application of material layers 412.

In some examples, step 504 of directing the melting energy beam 182 onto a non-melted region 402 may include directing one or more melting energy beams 182 onto the non-melted region 402 of the foil sheet 400 in a manner forming a melt pattern 408 (FIG. 6). The melt pattern 408 may have any configuration including, but not limited to, a dot matrix pattern or a checkerboard pattern of discrete melt segments 410. The melt segments 410 may be spaced apart by non-melted strips that intersect to form a lattice of non-melted portions 406 that allow tension to be maintained on the foil sheet 400 between the foil supply drum 150 and the foil take-up drum 152. After forming a melt pattern 408 to create at least a portion of a material layer 412, the foil sheet 400 may be translated and/or rotated in a manner to position another portion of the non-melted region 402 of the foil sheet 400 over the substrate surface 280, after which the melting energy beams 182 may form one or more additional melt patterns 408 toward completion of the material layer 412.

Step 508 (step d) of the method 500 includes rotating the foil supply drum 150 to dispense another lengthwise section of the foil sheet 400 over the most recently applied material layer 412. As mentioned above, step 508 of rotating the foil supply drum 150 may include rotating the foil take-up drum 152 in synchronization with rotation of the foil supply drum 150 to wind up the non-melted portions 406 of the foil sheet 400 onto the foil take-up drum 152 during dispensing of a non-melted region 402 of the foil sheet 400. As mentioned above, dispensing an additional non-melted region 402 of the foil sheet 400 may be performed after temporarily vertically translating the foil supply drum 150 and/or the build element 260 to create vertical separation between the foil sheet 400 and the substrate surface 280 of the most recently applied material layer 412.

In some examples, vertically translating the foil supply drum 150/foil take-up drum 152 and/or the build element 260 may include raising the foil supply drum 150 and foil take-up drum 152 in a coordinated manner to vertically separate the foil sheet 400 from the most recently applied material layer 412 to allow for advancement of the foil sheet 400 prior to forming a new material layer 412. For example, the foil supply drum 150 and the foil take-up drum 152 may be temporarily lifted by an amount raising the foil sheet 400 off of the most recently applied material layer 412, at which point the foil supply drum 150 and foil take-up drum 152 may be rotated in a synchronized manner to advance the foil sheet 400 over the most recently-applied material layer 412, after which the foil supply drum 150 and foil take-up drum 152 may be lowered back to their original position in preparation for the formation of a new material layer 412. As mentioned above, the foil sheet 400 may be vertically positioned to be spaced slightly above (e.g., less than 1.0 inch) the substrate surface 280 (e.g., the most recently applied material layer), or the foil sheet 400 may be vertically positioned to be in direct physical contact with the most recently applied material layer 412. Instead of or in addition to vertically translating the foil supply drum 150 to create separation between the foil sheet 400 and the most recently applied material layer 412, the method may include lowering the build element 260 (e.g., a build plate 264). For example, the build plate 264 may be incrementally lowered by a distance of no less than (e.g., substantially equal to) the foil thickness after the application of each one of the material layers 412.

Figure 10:
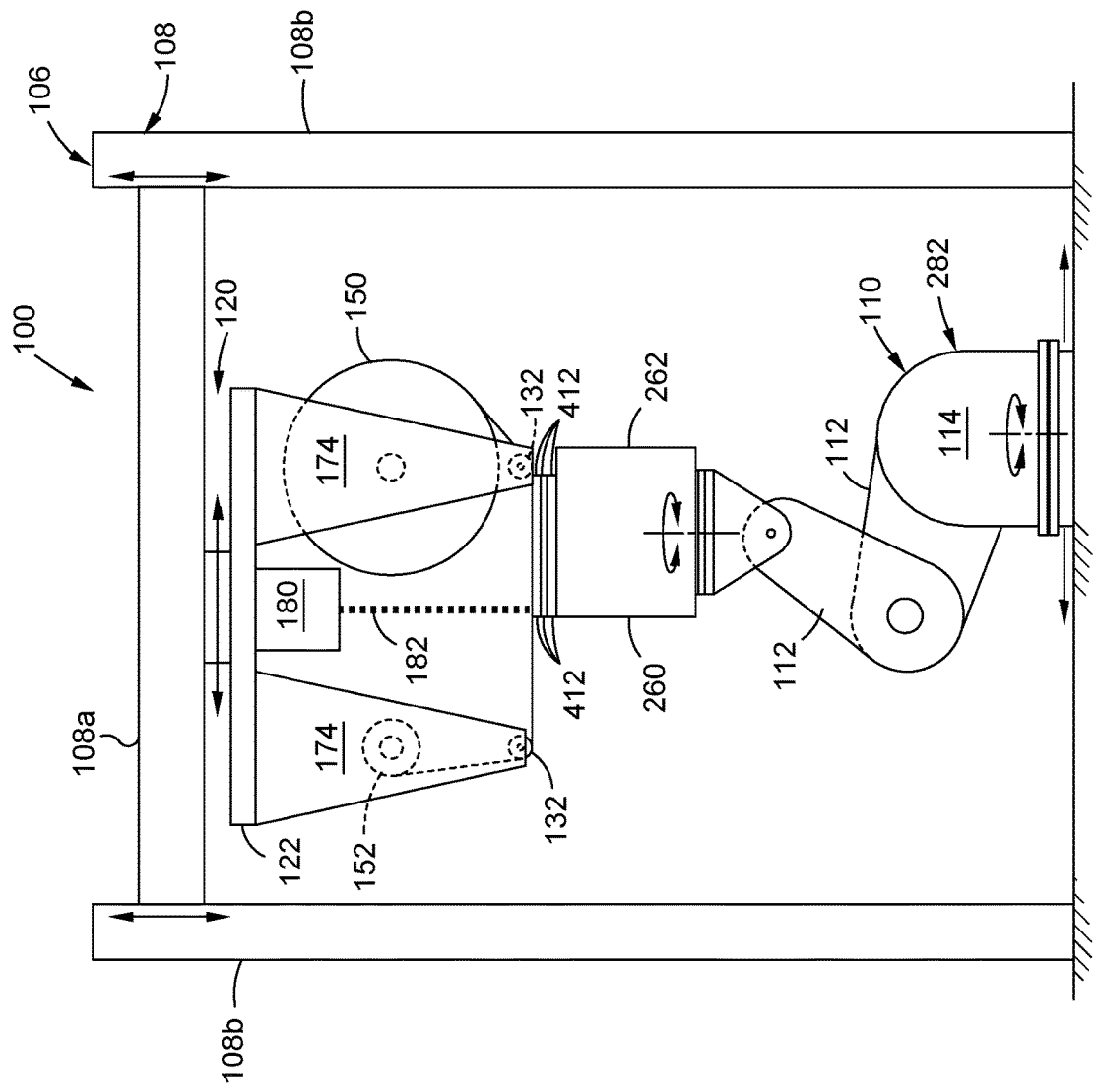
FIG. 10 is an example of the manufacturing system in which the build element has a three-dimensional seed shape supported by an element moving mechanism such as a robotic device for orienting and positioning the build element such that one or more of the substrate surfaces of the build element may be positioned below the foil application head.

As described above, the foil application head 120 of the manufacturing system 100 may be coupled to a head moving mechanism 106. In such examples, the method 500 may include moving, via the head moving mechanism 106 (e.g., a gantry 108, a robotic device 110), the foil application head 120 along any one a variety of directions. For example, the method may include translating the foil application head 120 along a direction locally parallel to the substrate surface 280 (e.g., along a horizontal direction) as may be required during dispensing of a foil sheet 400 (FIG. 13) and/or to position the foil application head 120 over any one a variety of substrate surfaces 280 of a build element 260. Alternatively or additionally, the method may include incrementally translating the foil application head 120 along a direction locally perpendicular to the substrate surface 280 (e.g., along a vertical direction) as may be required between the successive application of material layers 412 on top of one another. The method may also include rotating the foil application head 120 about an axis perpendicular to the substrate surface 280 (e.g., about the Z axis). Translation and/or rotation of the foil application head 120 may allow for adjusting the horizontal position, the vertical location, and/or the clocking orientation of the foil sheet 400 relative to the substrate surface 280. Such translation and/or rotation may allow for advancement of the foil sheet 400 between the application of successive material layers 412, or may allow the foil application head 120 to be positioned over different substrate surfaces 280 of the same build element 260. For example, as shown in FIGS. 10-11, a build element 260 may have multiple substrate surfaces 280 that are either non-co-planar or are non-parallel relative to each other. In addition, translation and/or rotation of the foil application head 120 may allow for maximizing the percentage of foil sheet 400 that is used to manufacture an object 416 such as by using a melt pattern 408 of discrete melt segments 410 as described above with regard to FIG. 6.

As an alternative to or in addition to moving the foil application head 120, the method 500 may include moving the build element 260 in a manner such that any one of the substrate surfaces 280 of the build element 260 faces upwardly and is horizontally oriented and positioned such that the non-melted region 402 of the foil sheet 400 is located directly above a substrate surface 280. The build element 260 may be coupled to an element moving mechanism 282 (e.g., a robotic device 110—FIGS. 10-11) as described above. The element moving mechanism 282 may be implemented for build elements 260 that have at least two substrate surfaces 280 that are non-co-planar and/or are non-parallel to each other. In this regard, the build element 260 may have a three-dimensional seed shape 262 (e.g., a cube, a cylinder, a sphere, etc.) having a plurality of substrate surfaces 280 that have different orientations and/or different relative locations and that each serve as a substrate surface 280 onto which material layers 412 are applied to manufacture a single object 416 (e.g., FIG. 12). Prior to the application of a material layer 412 or between the application of one or more material layers 412, the element moving mechanism 282 may change the orientation or location of the build element 260 such that at least one of the substrate surfaces 280 is located underneath the foil application head 120 and is oriented parallel to the non-melted region 402 of the foil sheet 400. The element moving mechanism 282 may move the build element 260 in any one a variety of directions including lateral translation along a direction locally parallel to a non-melted region 402 of the foil sheet 400, vertical movement along a direction locally perpendicular to the non-melted region 402 of the foil sheet 400, and/or rotation about any axis. The build element 260 may be moved (e.g., rotated and/or translated) while the foil application head 120 is stationary or while the foil application head 120 is moving.

Step 510 (step e) of the method 500 includes repeating steps 502-508 (steps a through d) until completion of the object 416 according to the digital definition 306. As indicated above, the manufacturing system 100 is configured to successively apply material layers 412 on top of one another until the object 416 is completed. Each material layer 412 is formed with perimeter edges 414 that are cut to match a profile of the material layer 412 as described in the digital definition 306 of the object 416. As mentioned above, each material layer 412 is formed as a result of melting the foil sheet 400 using one or more melting energy sources 180 controlled by a processor 300 executing computer readable program instructions 304 (e.g., of a numerical control (NC) program) based on the three-dimensional digital definition 306 of the object 416.

In some examples, method 500 may further include heating, using a preheater, the foil sheet 400, the foil supply drum, the object 416 (e.g., partially-built), and/or the build element 260 prior to and/or during the application of one or more of the material layers 412. For example, the foil sheet 400 may be preheated as the foil sheet 400 comes off the foil supply drum 150. As mentioned above, preheating may allow for an increase in the rate at which material layers 412 are applied by reducing the amount of energy required for the melting energy beam 182 to melt the foil sheet 400 into a material layer 412. Heating of the foil sheet 400 may be performed by a laser device or electron beam device, by a hot air heater (not shown) directing hot air toward the foil supply drum 150 and/or the foil sheet 400, and/or by using a plurality of heating elements circumferentially spaced around the build element 260 and/or build chamber 266. In another example, heating may be performed by a convection oven or by an induction furnace, either of which may be configured to enclose the foil supply drum 150, the foil sheet 400, the substrate surface 280, and/or the build chamber 266. In any one of the above examples, heating may be performed in a manner that maintains the foil sheet 400 above a predetermined minimum temperature prior to melting by the melting energy beams 182. Alternatively or additionally, heating may be performed by radiation heating in a manner maintaining a minimum temperature of the object 416 in the build chamber 266. In still other examples, heating may be performed by maintaining the inert gas 222 in the build chamber 266 above a predetermined minimum temperature to promote convection heating of the object 416. Such preheating may advantageously reduce thermal stress and distortion in the object 416 occurring during solidification of the material layers 412. In addition, preheating may allow for improved management of the cooling rate of the material layers 412 which may result in an improvement of the microstructure of the object 416. Furthermore, preheating may reduce the need for structural supports that may otherwise be required for resisting thermal distortions in the object 416 during the application of material layers 412.

The method 500 may include emitting inert gas 222 to surround and shield the molten foil material from oxygen during the melting of the foil sheet 400. For example, as described above, an inert gas source 220 may emit inert gas 222 such as argon in a manner forming an inert gas 222 plume that at least surrounds the molten foil material. To assist in surrounding the molten foil material with inert gas 222, the method 500 may further include at least partially surrounding the molten foil material using a tenting structure 224, as described above. The tenting structure 224 may at least partially contain the inert gas 222 around the molten foil and assist in preventing oxygen from contacting the molten foil material. The method 500 may further include maintaining, using the inert gas 222 emitted by the inert gas source 220, the object 416 below a maximum temperature during the application of one or more material layers 412 to avoid overheating the object 416. The temperature of the inert gas 222 may be controlled as a means to control the temperature of the object 416. For example, the inert gas 222 may be colder than the ambient environment surrounding the object 416, and may therefore function as cooling gas. A further technique that may be implemented for maintaining the object 416 below a maximum temperature is periodically halting the manufacturing process and/or removing the object 416 from the manufacturing system 100 (e.g., from the build chamber 266) to allow the object 416 to cool prior to reinstalling the object 416 in the manufacturing system 100 and restarting the manufacturing process.

To maximize manufacturing efficiency, the method 500 may optionally include blowing gas toward the molten foil material or toward the path of the melting energy beams 182. For example, as mentioned above, gas may be blown toward the molten foil material using a gas blowing device 240 such as the inert gas source 220. The gas may be air or the gas may be inert gas 222 emitted in a manner to blow smoke and/or soot away from the molten foil material and away from the area through which the melting energy beam 182 passes. As described above, smoke or soot may be a byproduct of the melting of the foil sheet 400 and may undesirably interfere with or reduce the amount of melting energy at the melting spot(s) for melting the foil sheet 400.

In some examples, the method 500 may include enclosing a portion of or all of the manufacturing system 100 within an environmental enclosure 102. The environmental enclosure 102 may be configured to enclose at least the build element 260, the foil supply drum, the foil take-up drum, and/or the melting energy source. The environmental enclosure 102 may be fluidly coupled to a vacuum source 104 for forming at least a partial vacuum within the environmental enclosure 102 as may be required for certain configurations of the manufacturing system 100 or for certain foil materials. For example, a vacuum may be required when the melting energy source 180 is an electron beam device.

The method 500 may further include emitting one or more finishing energy beams 192 toward the object 416 during and/or after completion of the object 416. A finishing energy beam 192 may be a laser beam, an electron beam, or other type of finishing energy beam 192 capable of localized heating of portions of the object 416. A finishing energy beam 192 may be emitted from a finishing energy source 190 toward one or more surfaces of the object 416. The finishing energy source 190 may be movable along a finishing track system 194 or via other means to allow the finishing energy beam 192 to be locally applied to any one of the surfaces of the object 416. The finishing energy beam 192 may be emitted to perform any one of a variety of operations. For example, the finishing energy beam 192 may be locally applied to heat the object 416 as a means to normalize the thermal time history in order to minimize temperature differences at different locations of the object 416 to minimize thermal distortion of the object 416 during solidification and fusing of the material layers 412. As described above, the finishing energy beam 192 may locally preheat specific areas of the object 416 as a means to establish uniform temperature of the object 416 prior to or during the application of each material layer 412. The finishing energy beam 192 may also perform stress relieving of the object 416, and may improve the surface finish of the object 416 by re-melting and allowing surface tension to smooth irregularities in the object 416 surfaces. Such irregularities may be caused by offsets in the perimeter edges 414 of adjacent material layers 412. In addition, the finishing energy beam 192 may fuse together the material layers 412 of the object 416 such as along the perimeter edges 414. The ability to perform the above-noted processing steps during manufacturing of the object 416 allows for an increased production rate and improved quality of the completed object 416 relative to objects manufactured using powder bed additive manufacturing.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An additive manufacturing system for forming a object, comprising:
   at least one foil supply drum configured to be rotated for dispensing a foil sheet over a substrate surface supported by a build element;
   at least one melting energy source configured to direct at least one melting energy beam onto a non-melted region of the foil sheet located over the substrate surface; and
   a processor configured to execute computable readable program instructions based on a three-dimensional digital definition of the object, and control the melting energy beam to selectively melt at least some of the non-melted region into melted portions for successively forming a plurality of material layers of the object, and fusing a majority of each material layer to the substrate surface while separating the melted portions from non-melted portions, and command rotation of the foil supply drum for dispensing the foil sheet during additive manufacturing of the object in correspondence with the digital definition.

2. The manufacturing system of claim 1, further comprising:
   at least one foil take-up drum configured to be rotated, under command of the processor, in synchronization with the foil supply drum for taking up the non-melted portions of the foil sheet during advancement of the foil sheet relative to the substrate surface after the application of each one of the material layers.

3. The manufacturing system of claim 2, wherein:
   the foil supply drum and the foil take-up drum are configured to be raised in unison, under command of the processor, for vertically separating the foil sheet from the material layer most recently applied to allow for advancement of the foil sheet over the foil sheet and/or to allow lateral translation of the foil sheet relative to the substrate surface or rotation of the foil sheet.

4. The manufacturing system of claim 1, wherein the build element is configured to be moved under command of the processor in at least one of the following directions after the formation of a material layer:
   lowered relative to the foil sheet;
   rotated about a vertical axis.

5. The manufacturing system of claim 1, wherein:
   the at least one melting energy source is a laser device, an electron beam device, or a combination thereof.

6. The manufacturing system of claim 1, wherein:
   the processor is configured to cause the melting energy source to direct the one or more melting energy beams onto the non-melted region of the foil sheet in a manner forming a melt pattern of discrete melt segments spaced apart by non-melted portions during application of one or more of the material layers.

7. The manufacturing system of claim 1, further including:
   a build chamber at least partially surrounding the substrate surface and configured to at least partially contain inert gas at least at a location surrounding molten foil material of the melted portions.

8. The manufacturing system of claim 1, further comprising:
   a mounting frame configured to support the foil supply drum and the melting energy source; and
   the mounting frame, the foil supply drum, and the melting energy source collectively defining a foil application head configured to be coupled to a head moving mechanism configured to translate the foil application head over the substrate surface.

9. The manufacturing system of claim 8, wherein the foil application head further includes:
   a dispensing mechanism configured to receive the foil sheet dispensed from the foil supply drum and apply the foil sheet onto the substrate surface during movement of the foil application head over the substrate surface along a lengthwise direction of the foil sheet.

10. The manufacturing system of claim 1, wherein:
the build element is configured to be coupled to an element moving mechanism configured move, under command of the processor, the build element in a manner such that any one of the substrate surfaces faces upwardly and is positioned such that the foil sheet is located above the substrate surface.

11. The manufacturing system of claim 1, wherein:
the at least one foil supply drum comprises a first foil supply drum and a second foil supply drum configured to respectively dispense a first foil sheet and a second foil sheet that is either the same material configuration or a different material configuration than the first foil sheet; and
the processor configured to command the first foil supply drum and the second foil supply drum to dispense the first foil sheet and the second foil sheet at different times during the manufacturing of the object.

12. The manufacturing system of claim 1, further comprising:
at least one finishing energy source configured to emit at least one finishing energy beam for applying energy to one or more surfaces of the object during and/or after building of the object.

13. An additive manufacturing system for forming a object, comprising:
at least one foil supply drum configured to be rotated for dispensing a foil sheet over a substrate surface supported by a build element;
at least one foil take-up drum configured to take up the foil sheet during dispensing by the foil supply drum;
at least one melting energy source configured to direct at least one melting energy beam onto a non-melted region of the foil sheet located over the substrate surface; and
a processor configured to execute computable readable program instructions based on a three-dimensional digital definition of the object, and control the melting energy beam to selectively melt at least some of the non-melted region into melted portions for successively forming a plurality of material layers of the object, and fusing a majority of each material layer to the substrate while separating the melted portions from non-melted portions, and command synchronized rotation of the foil supply drum and foil take-up drum for dispensing the foil sheet during additive manufacturing of the object in correspondence with the digital definition.

14. A method of additively manufacturing an object, comprising:
(a) dispensing, by rotating a foil supply drum, a foil sheet over a substrate surface supported by a build element;
(b) directing, from at least one melting energy source, at least one melting energy beam onto a non-melted region of the foil sheet located over the substrate surface;
(c) melting, using the melting energy beam, the non-melted region into one or more melted portions to successively form a plurality of material layers over the substrate surface and fusing a majority of each material layer to the substrate surface in accordance with a three-dimensional digital definition of the object while separating or cutting the melted portions from non-melted portions to form perimeter edges of the material layer in correspondence with the digital definition;

(d) rotating the foil supply drum to dispense another non-melted region of the foil sheet over the material layer; and
(e) repeating steps (a) through (d) until completion of the object according to the digital definition.

15. The method of claim 14, further comprising:
rotating a foil take-up drum in synchronization with rotation of the foil supply drum during dispensing of a non-melted region of the foil sheet over the material layer.

16. The method of claim 14, further comprising:
vertically translating, after forming a material layer and prior to rotating the foil supply drum to dispense another non-melted region, the foil supply drum and/or the build element to vertically separate the foil sheet from the material layer.

17. The method of claim 16, wherein the step of vertically translating the foil supply drum and/or the build element comprises:
lowering the build element under command of a processor after the application of each material layer.

18. The method of claim 14, wherein the step of directing the melting energy beam comprises:
emitting at least one melting energy beam from a laser device, an electron beam device, or a combination thereof.

19. The method of claim 14, wherein the step of directing the melting energy beam onto a non-melted region includes:
directing one or more melting energy beams onto the non-melted region of the foil sheet in a manner forming a melt pattern of discrete melt segments spaced apart by non-melted portion during application of one or more of the material layers.

20. The method of claim 14, wherein prior to directing the melting energy beam, the method includes:
at least partially surrounding the substrate surface with a build chamber configured to at least partially contain inert gas at least at a location surrounding molten foil material of the melted portions.

21. The method of claim 14, wherein and the melting energy source are support on a mounting frame of a foil application head configured to be coupled to a head moving mechanism, the step of dispensing the foil sheet over the substrate surface comprising:
translating the foil application head over the substrate surface along a lengthwise direction of the foil sheet while dispensing the foil sheet at a same rate at which the foil application head is translated.

22. The method of claim 21, wherein the step of dispensing the foil sheet over the substrate surface further includes:
applying, using a dispensing mechanism of the foil application head, the foil sheet onto the substrate surface during movement of the foil application head over the substrate surface.

23. The method of claim 14, further including:
moving, via an element moving mechanism under command of a processor, the build element in a manner such that any one of the substrate surfaces faces upwardly and is horizontally oriented and positioned such that the non-melted region of the foil sheet is located above the substrate surface.

24. The method of claim 14, wherein the step of dispensing the foil sheet over the substrate surface further comprises:
dispensing, under command of a processor, a first foil sheet and a second foil sheet at different times during the manufacturing of the object for forming different material layers of the object; and the first foil sheet having a different material configuration than the second foil sheet.

* * * * *